US005742811A

United States Patent [19]
Agrawal et al.

[11] Patent Number: 5,742,811
[45] Date of Patent: Apr. 21, 1998

[54] METHOD AND SYSTEM FOR MINING GENERALIZED SEQUENTIAL PATTERNS IN A LARGE DATABASE

[75] Inventors: Rakesh Agrawal; Ramakrishnan Srikant, both of San Jose, Calif.

[73] Assignee: International Business Machines Corporation, Armonk, N.Y.

[21] Appl. No.: 541,665

[22] Filed: Oct. 10, 1995

[51] Int. Cl.$^6$ .................................................. S06F 17/30
[52] U.S. Cl. ................................... 395/606; 395/606
[58] Field of Search ................................... 395/605, 606

[56] References Cited

U.S. PATENT DOCUMENTS

| | | | |
|---|---|---|---|
| 5,423,032 | 6/1995 | Byrd et al. | 395/605 |
| 5,442,781 | 8/1995 | Yamagata | 395/603 |
| 5,546,578 | 8/1996 | Takada | 395/605 |
| 5,598,557 | 1/1997 | Doner et al. | 395/605 |
| 5,615,341 | 3/1997 | Agrawal et al. | 395/210 |

OTHER PUBLICATIONS

Agrawal et al., An Interval Classifier for Database Mining Applications, Proc of the 18th VLDB Conference, Vancouver, British Columbia, Aug. 31, 1992, pp. 560–573.

Dietterich et al., Discovering Patterns in Sequences of Events, Artificial Intelligence, Elsevier Science Publishers B.V. (North Holland), pp. 187–232, 1985.

R. Agrawal et al., Mining Sequential Patterns, Int'l Conference on Data Engineering, pp. 3–14, Mar. 1995.

H. Mannila et al., Discovering Frequent Episodes in Sequences (Extended Abstract) Int'l Conference on Knowledge Discovery in Databases and Data Mining, Dec. 1993, KDD-95, pp. 210–215.

R. Agrawal et al., Fast Algorithms for Mining Association Rules, Proceedings of the 20th VLDB Conf., Santiago, Chile, pp. 487–499, 1994.

J Wang et al., Combinatorial Pattern Discovery for Scientific Data: Some Preliminary Results, Proc. of the ACM SIGMOD Conf. on Management of Data, Minneapolis, pp. 115–125, May 1994.

R. Agrawal et al., Mining Association Rules Between Sets of Items in Large Databases, Proc. of the ACM SIGMOD Conf. on Management of Data, pp. 207–216, Washington, D.C. May 1993.

R. Agrawal et al., Database Mining: A Performance Perspective, IEEE Transactions on Knowledge and Data Eng. Special Issue on Learning and Discovery in Knowledge-Based Databases, pp. 914–925, Dec. 1993.

R. Srikant et al., Mining Generalized Association Rules, IBM Research Report 9963 (87922), Jun. 27, 1995.

M. Houtsma et al., Set-Oriented Mining for Association Rules, Research Report 9567 (83573) Oct. 22, 1993.

*Primary Examiner*—Wayne Amsbury
*Attorney, Agent, or Firm*—Khanh Q. Tran; James C. Pintner

[57] ABSTRACT

A method and apparatus are disclosed for mining generalized sequential patterns from a large database of data sequences, taking into account user specified constraints on the time-gap between adjacent elements of the patterns, sliding time-window, and taxonomies over data items. The invention first identifies the items with at least a minimum support, i.e., those contained in more than a minimum number of data sequences. The items are used as a seed set to generate candidate sequences. Next, the support of the candidate sequences are counted. The invention then identifies those candidate sequences that are frequent, i.e., those with a support above the minimum support. The frequent candidate sequences are entered into the set of sequential patterns, and are used to generate the next group of candidate sequences. Preferably, the candidate sequences are generated by joining previously found frequent candidate sequences, and candidate sequences having a contiguous subsequence without minimum support are discarded. In addition, the invention includes a hash-tree data structure for storing the candidate sequences and memory management techniques for performance improvement.

45 Claims, 12 Drawing Sheets

METHOD AND SYSTEM FOR MINING GENERALIZED SEQUENTIAL PATTERNS IN A LARGE DATABASE

CROSS REFERENCE TO RELATED APPLICATIONS

This application contains material related to the following co-pending U.S. patent applications, which are commonly assigned with this application:

U.S. patent application Ser. No. 08/436,794, filed Apr. 14, 1994, for "System and Method for Mining Generalized Association Rules In Databases", now U.S. Pat. No. 5,516,341;

U.S. patent application Ser. No. 08/1398,640, filed Mar. 3, 1995, for "System and Method for Mining Sequential Patterns In A Large Database", now pending;

U.S. patent application Ser. No. 08/415,006, filed Mar. 3, 1995, for "System and Method for Quickly Mining Association Rules In A Database", now pending; and U.S. patent application Ser. No. 08/500,717, filed Jul. 11, 1995, for "System and Method for Parallel Mining Of Association Rules in Databases", now pending.

The above-referenced U.S. patent application Ser. Nos. 08/1398,640 and 08/1436,794 are incorporated herein by reference.

FIELD OF THE INVENTION

The present invention generally relates to data processing, and more particularly, to the field of computer data mining. In particular, the invention relates to methods and apparatus for mining generalized sequential patterns in a large database in which user-specified time constraints and taxonomy are taken into consideration.

BACKGROUND OF THE INVENTION

Customer purchasing habits can provide invaluable marketing information for a wide variety of applications. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

It will be appreciated that purchasing patterns can be classified many ways. For example, it may be desirable to know what non-empty set of items (termed herein an "itemset"), a consumer is likely to buy together during a single transaction. Of importance to the present invention are customer transaction patterns over time, in view of user-defined time constraints over elements of the patterns and relationships between data items. Stated differently, the; focus of the present invention is to identify patterns in temporally-spaced customer transactions, taking into account the time constraints and taxonomy as defined below.

The present invention recognizes that by knowing such patterns, retailers and catalog companies can, for example, create advertising and mailings which are relatively highly appealing because such advertising would be developed with the customers' previous transactions in mind. It is to be understood that although this discussion focuses on the marketing applications of the present invention, database mining and, hence, the principles of the present invention, are useful in many other areas such as business and science.

Until recently, deriving useful information from large databases, and even compiling very large databases, were highly impracticable. Consequently, marketing and advertising strategies have been primarily based on collected evidence of purchasing patterns, which are difficult and inefficient. With the advent of modern technology, however, compiling large databases of customer transactions has become much more feasible. The bar-code reader can almost instantaneously read so-called basket data, i.e., when a particular item from a particular lot was purchased by a customer, how many items the customer purchased, and so on, for automatic electronic storage of the basket data. Further, when the purchase is made with a credit card, the identity of the purchaser can be almost instantaneously known, recorded, and stored along with the basket data. Still further, vastly improved data storage media have made it possible to electronically store vast amounts of such information for future use.

Compiling large databases, however, is only part of the marketing challenge. Another important part is the mining of the database for useful information. Such database mining becomes increasingly problematic as the size of databases expands into the gigabyte and even the terabyte range.

Further complicating the particular problem of mining large database is that in attempting to identify customer purchasing patterns (i.e., sequences), as the skilled artisan will appreciate, consecutive characters of the sequences are not separated by noise characters of fixed length, but rather by noise characters of variable length. Consequently, past efforts to identify sequences in which the characters are separated by noise characters of fixed length, designed as they are to solve problems different than the one addressed herein, are ineffective to solve the particular problem faced by the present inventors. Moreover, the sequences sought to be identified by the present invention can consist of sets of characters, rather than just characters.

The problem of sequential patterns was introduced in the paper "*Mining Sequential Patterns*" by R. Agrawal and R. Srikant, Proceedings of the International Conference on Data Engineering, March 1995, pp. 3–14, (hereinafter, "*Mining Sequential Patterns*" paper). Although three algorithms were; described for solving the problem, none of the algorithms handles time constraints, sliding windows, or taxonomies. Two of the algorithms were designed to find only maximal patterns; however, many applications require all patterns and their support. The third algorithm, AprioriAll, finds all patterns, but has other disadvantages.

First, it is computationally expensive to do the data transformation on-the-fly during each pass while finding sequential patterns. Alternatively, transforming the database once and storing the transformed database will be infeasible and unrealistic for many applications, since it nearly doubles the disk space requirement which could be prohibitive for large databases. Secondly, while it may be possible to extend the AprioriAll algorithm to handle time constraints and taxonomies, it does not appear feasible to incorporate sliding time windows.

In the above-referenced U.S. patent application Ser. No. 08/398,640, for "SYSTEM AND METHOD FOR MINING SEQUENTIAL PATTERNS IN A LARGE DATABASE" (hereinafter, the '640 application), a method and system for mining sequential patterns in a large database of transactions were disclosed. The method first identifies which sequences are frequent (or large), i.e., those which recur in the database with a defined regularity or minimum support. It then determines which sequences are maximal, i.e., the large sequences which are not subsets of other large sequences. The set of maximal large sequences is returned to the user to indicate recurring purchasing patterns over time.

The '640 application, however, does not consider user-specified time constraints on the sequential patterns to be derived. A user often wants to impose certain maximum or minimum time gaps between adjacent elements of the sequential patterns. For example, a book club is probably not concerned with whether a customer bought a book titled "Foundation", followed by a book titled "Foundation and Empire" three years later. The club may be interested only if the sale transactions have occurred within a three-month period.

The present invention addresses such time constraints by allowing the user to state a maximum or a minimum time-gap, or both, between adjacent elements of the sequential patterns. Thus, in the above example, the book club would specify that a customer supports a sequential pattern only if adjacent elements occur within a specified time-gap. In this case, the maximum time-gap is three months.

Another disadvantage of the prior art methods, such as one disclosed in the '640 application, is their rigid definition of a transaction. For many applications of the concept of mining sequential patterns, it does not matter if items in an element of a sequential pattern were present in two different transactions, as long as the transaction-times of those transactions are within some time window.

The method of the present invention generalizes the definition of a transaction by removing the restriction that the items in an elements of a sequential pattern must come from the same transaction. Instead, the items may be present in a set of transactions whose transaction-times are within a userspecified time window. That is, each element of the pattern can be contained in the union of the items bought in a set of transactions, as long as the difference between the maximum and minimum transactions-times is less than the sliding window time.

Another problem not addressed by previous sequential pattern mining methods concerns a user-defined taxonomy over the data items. A taxonomy is a set of hierarchical is-a relationships over the items as specified by the user. An example of a taxonomy is shown in FIG. 2 where the taxonomy includes the relationships "Foundation is-a Asimov", "Asimov is-a Science Fiction", etc. With this taxonomy, a customer who bought "Foundation" followed by "Perfect Spy" would support the patterns "'Foundation' followed by 'Perfect Spy'", "'Asimov' followed by 'Perfect Spy'", "'Science Fiction' followed by 'Perfect Spy'", "'Foundation' followed by 'Le Carre'", "'Asimov' followed by 'Le Carte'", etc. In such a case, the user would typically want to find patterns that include items across different levels of the taxonomy.

From the foregoing, the problem of mining generalized sequential patterns may be stated as follows. Given a database of sequences, where each sequence is a list of transactions ordered by transaction-time, and each transaction is a set of items. The problem is to discover all sequential patterns with a user-specified minimum support, where the support of a pattern is defined as the number of data sequences that contain the pattern. The problem is generalized by adding time constraints that specify a minimum or maximum time period between adjacent elements in a sequential pattern.

Furthermore, instead of requiring that the items in an element of a sequential pattern must come from the same transaction, it is only necessary that the items are present in a set of transactions whose transaction-times are within a user-specified time window. In addition, given a user-defined taxonomy on the items, the desired sequential patterns may include items across all levels of the taxonomy.

Accordingly, it is an object of the present invention to provide a method and system for ascertaining generalized data patterns in a transaction database, taking into consideration user-specified time constraints on adjacent elements in a pattern. Another object of the present invention is to provide a method and system for rapidly finding sequential patterns where items in an element of a sequential pattern are present in two or more transactions, as long as the transaction-times of those transactions are within some time window. Still another object of the present invention is to find generalized sequential patterns that include items across different levels of a taxonomy defined by the user over the items in the data.

SUMMARY OF THE INVENTION

The present invention relates to methods and systems for mining generalized sequential patterns from a large database of data sequences. Each data sequence is a list of transactions ordered by transaction time. Each transaction, also referred to as an itemset, is a set of data items. There is a hierarchical taxonomy over the items specified by the user which defines descendant and ancestor relationships between the data items.

In addition to the taxonomy, the present invention takes into account user-specified time constraints on the time-gap between adjacent elements of a pattern in determining the sequential patterns. The present invention also considers items in an element that are present in two or more transactions, as long as the transaction-times are within a user-defined time window.

The present invention achieves the foregoing and other objects by providing a method for mining generalized sequential patterns in a large database consisting of the following steps. First, the items having a minimum support, i.e., frequent items, are determined. The support of an item is defined as the number of data sequences in the database that contain the item. Next, the set of items with minimum support is used as a seed to generate candidate sequences from the items, and the support for each candidate sequence is counted. The method then determines among the candidate sequences those that are frequent and adds them to a set of sequential patterns to be output as a result. Finally, the frequent candidate sequences just found are used as the seed to generate the next group of candidate sequences. The method continues by repeating itself until no candidate sequences are generated or no frequent candidate sequences are found.

Preferably, the generation of candidate sequences includes joining, according to a predetermined joining scheme, the frequent candidate sequences found in the immediately preceding execution of the method steps. Furthermore, the step of generating includes deleting from a set $C_k$ of candidate k-sequences those sequences that have a contiguous (k-1)-subsequence, where the contiguous (k-1)-subsequence has a support count that is less than the minimum support. Furthermore, any candidate k-sequence having a subsequence without the minimum support is also deleted from the set $c_k$, if there are no constraints as to the maximum time-gap between adjacent elements of a sequential pattern.

In a preferred embodiment of the present invention, the deletion of candidate k-sequences from the set $c_k$ includes determining, for each candidate k-sequence c of the set $C_k$ and for each contiguous (k-1)-subsequence s of c, whether the contiguous (k-1)-subsequence s is present in a set $L_{k-1}$ of all frequent (k-1)-sequences. If s is not present in the set $L_{k-1}$ the candidate k-sequence is deleted from the set $c_k$ of candidate k-sequences.

Another aspect of the present invention involves finding the frequent candidate sequences in an efficient manner. Accordingly, the generated candidate sequences are organized using a hash-tree data structure so that the candidate sequences supported by a data sequence d can be found quickly. The hash-tree data structure has a root, many interior nodes and leaf nodes. Each interior node represents a hash table used by a hash function, while each leaf node represents a list of candidate sequences. In a preferred embodiment of the invention, the method further includes the step of adding to the hash-tree each candidate sequence that is generated. Furthermore, the method includes the step of determining the candidate sequences of the hash-tree that are contained in a data sequence d when counting the support for the candidate sequences.

Preferably, the step of adding a candidate sequence to the hash-tree includes traversing the hash-tree and determining whether a current node; is an interior node or leaf node. The current node is initially set to the root of the hash-tree. If the current node is an interior node, a hash function is applied to the p-th item of the candidate sequence to be added to determine a bucket in the hash table of the current node. The current node is set to the node corresponding to the bucket. The steps are repeated starting with checking whether the new current node is an interior node or leaf node.

If the current node is a leaf node, the candidate sequence is added to this leaf node. The leaf node is further converted to an interior node if the number of candidate sequences in the leaf node exceeds a certain threshold.

Also in the preferred embodiment, in determining the candidate sequences of the hash-tree contained in a data sequence d, the hash-tree nodes are traversed to examine the stored candidate sequences. A current node is initially set to the root of the hash-tree. If the current node is an interior node, a hash function is applied to each item of the data sequence d to determine a set of buckets b in the hash-table of the current node. Each bucket corresponds to a node of the tree. For each node n corresponding to a bucket b, the current node is set to node n and the steps are repeated, starting with checking whether the current node is an interior node.

If the current node is a leaf node, for each candidate sequence s in the leaf node, the method includes determining whether the data sequence d supports the candidate sequence s, and incrementing the count for the candidate sequence s if s is supported by d.

In a preferred embodiment of the present invention, the step of determining whether a data sequence d contains a candidate sequence s includes a forward phase and a backward phase. The forward phase generally has two parts. The first part involves finding successive elements $s_i$ of the candidate sequence s in the data sequence d, as long as the difference between end-time($s_i$) and start-time($s_{i-1}$) is less than or equal to a maximum time-gap. End-time($s_i$) denotes the end-time of a just found element, while start-time($s_{i-1}$) is the start-time of the element preceding the just found element. In the second part, the forward phase switches to the backward phase if $s_i$ is not the first element of candidate sequence s and the difference between end-time($s_i$) and start-time($s_{i-1}$) is more than the maximum time-gap.

Similarly, the backward phase generally includes two parts. First, it finds preceding elements $s_{i-1}$ of the candidate sequence s in the data sequence; d, after time end-time($s_i$) minus the maximum time-gap, and as long as the difference between end-time($s_i$) and start-time($s_{i-1}$) is more than the maximum time-gap. The backward phase then switches to the forward phase if the just found element is the first element of the candidate sequence s, or if the difference between end-time ($s_i$) and start-time($s_{i-1}$) is less than or equal to the maximum time-gap.

Preferably, the procedure for finding successive elements above includes, for each item of an element of the candidate sequence s, finding the first occurrence of the item in the data sequence d after a time t. If the first occurrence for each item of the element is not found, the data sequence d does not contain the element after time t. If the first occurrence for each item of the element is found, the difference between the end-time and start-time of the element is compared to a sliding time window. The time t is set to the end-time of the element minus the sliding time window, if this difference is more than the window. The procedure steps are repeated starting with finding the first occurrence of each item after the new time t. If the difference is equal to or less than the time window, the data sequence d contains the element after time t.

In another aspect of the present invention, the taxonomy over the data items is a directed acyclic graph (DAG) taxonomy. Each vertex of the DAG corresponds to an item, or event, while an edge from item A to item B denotes that item A occurred before B. As a basic approach, each data sequence; is replaced by an extended data sequence. Each transaction of the extended data sequence has all the items in a corresponding transaction of the replaced data sequence and all the ancestors of all the items in the corresponding transaction.

For optimization purposes, the method further includes accessing the DAG taxonomy to predetermine the ancestors of each item before each generation of candidate sequences, and deleting the ancestors not present in any of the candidate sequences being counted. In a further optimization, the method includes deleting those candidate sequences having an element that contains both an item and an ancestor of the item, prior to counting the support for the candidate sequences.

In a preferred embodiment of the invention, the step of accessing the DAG taxonomy includes adding the predetermined ancestors to a set of predetermined ancestors. The method further includes adding, for each element $s_i$ in each data sequence s and for each item x in the element $s_i$, the ancestors of the item x present in the set of predetermined ancestors to the element $s_i$. The method also comprises the step of removing duplicates of items in $s_i$, for each $s_i$, from the data sequence s, prior to counting the support for the candidate sequences.

In yet another preferred embodiment, as many candidate sequences are generated as they will fit into a data memory during the generation of candidate sequences. Furthermore, the method includes writing the identified frequent candidate sequences into a data storage area and deleting the candidate sequences without minimum support, after the support counting step.

In still another aspect of the present invention, a computer program product is disclosed for mining generalized sequential patterns from a large database. The product includes a recording medium, means recorded on the recording medium for instructing the product to perform the described method steps.

In yet another aspect of the present invention, a database mining system is disclosed for discovering generalized sequential patterns in a large database. The system includes means for determining items with at least the minimum support, means for generating candidate sequences, means for identifying frequent candidate sequences and adding them to an output set of sequential patterns, and means for repeating the operation of the system. Preferably, the generating means includes means for joining frequent candidate sequences, and means for discarding candidate sequences having subsequences with less than the minimum support. In another preferred embodiment, the system includes means for storing the candidate sequences in a hash-tree data structure for identifying the frequent candidate sequences quickly, and means for adding candidate sequences to the hash-tree.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

DESCRIPTION OF THE PREFERRED EMBODIMENTS

The invention will be primarily described in terms of a method for mining generalized sequential patterns in a large database of data sequences. However, persons skilled in the art will recognize that a computing system, which includes suitable programming means for operating in accordance with the method to be disclosed, also falls within the spirit and scope of the invention. In addition, the invention may also be embodied in a computer program product, for instance, a recording medium such as a diskette, for use with a suitable data processing system. Programming means may be provided for directing the data processing system to execute the steps of the method of the invention. Such programming means is typically written on the recording medium in a form read by the data processing system.

Figure 1:
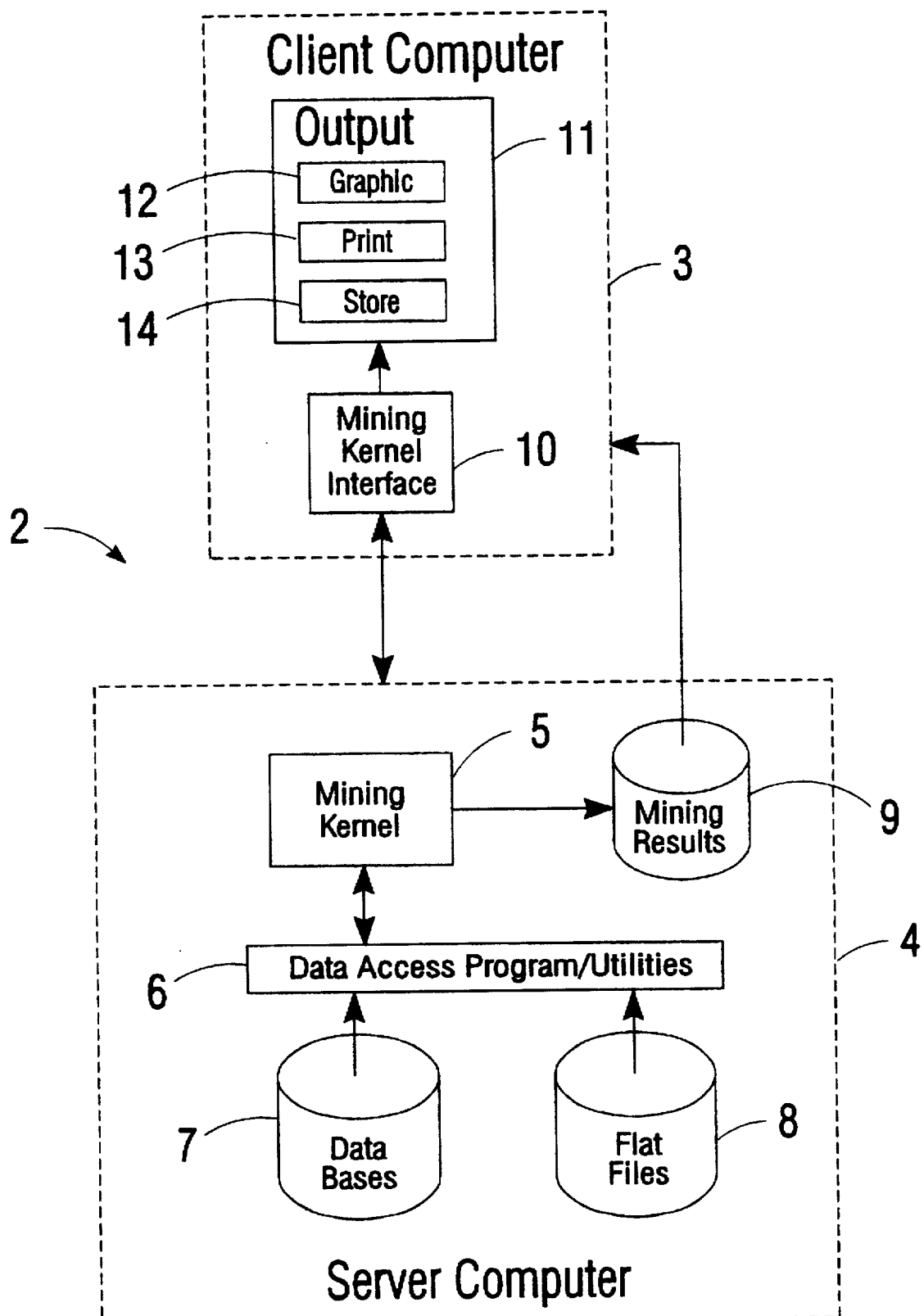
FIG. 1 is a simplified block diagram of the system for mining generalized sequential patterns of the present invention.

FIG. 1 is a simplified block diagram of a typical computing system 2 with which the method of the invention is to be practiced. In FIG. 1, the system 2 includes one or more data processing apparatus, such as a client computer 3 and a server computer 4. In one intended embodiment, the server computer 4 may be a mainframe computer made by IBM Corp., and use an operating system such as one marketed by IBM Corp. under the name MVS. Alternatively, the server computer 4 may be an IBM RS/6000 workstation running version 3.2.5 of the IBM AIX operating system. The server computer 4 may have a database system such as IBM DB2, or it may have data stored as data files, i.e., flat files, in a data storage medium such as a diskette, disk, or tape. It is to be understood that architectures other than the one shown may be used. For example, the functions of the client computer 3 may be incorporated into the server computer 4, and vice versa.

As shown, the operating system of the server computer 4 includes a mining kernel 5 which may be executed by a processor within the server computer 4 as a series of computer-executable instructions. These instructions may reside, for example, in the RAM of the server computer 4. Alternatively, the instructions may be contained on a data storage device with a computer readable medium, such as a computer diskette, a DASD array, magnetic tape, optical storage device, or other suitable data storage devices. As an illustrative embodiment, the instructions may be implemented using the popular C++ computer programming language.

FIG. 1 shows that, through appropriate data access programs and utilities 6, the mining kernel 5 accesses one or more databases 7 or flat files 8 which contain data transactions. After executing the steps described below, the mining kernel 5 outputs sequential patterns it discovers to a mining results depository 9, which can be accessed by the client computer 3.

Additionally, FIG. 1 shows that the client computer 3 can include a mining kernel interface 10 which, like the mining kernel 5, may be implemented in suitable computer code. Among other things, the interface 10 functions as an input mechanism for establishing certain variables, including the values of the minimum support and time-gap constraints as defined below. Further, the client computer 3 preferably includes an output device 11 for outputting or displaying the mining results. As shown, the output device 11 may include a display monitor 12, a printing device 13, or a data storage medium 14.

Figure 2:
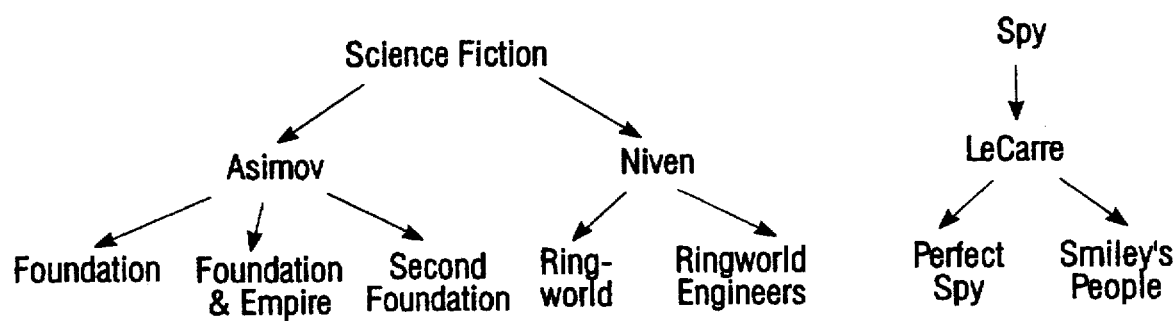
FIG. 2 illustrates an example of a taxonomy over the data items.

FIG. 2 illustrates an example of a taxonomical relationship among the data items typical of ones to which this invention applies. The taxonomy here is defined as a set of relationships in which "Foundation is-a Asimov", "Asimov is-a Science Fiction", etc. With this taxonomy, a customer who bought "Foundation" followed by "Perfect Spy" would support the patterns "'Foundation' followed by 'Perfect Spy'", "'Asimov' followed by 'Perfect Spy'", "'Science Fiction' followed by 'Perfect Spy'", etc.

Figure 3:
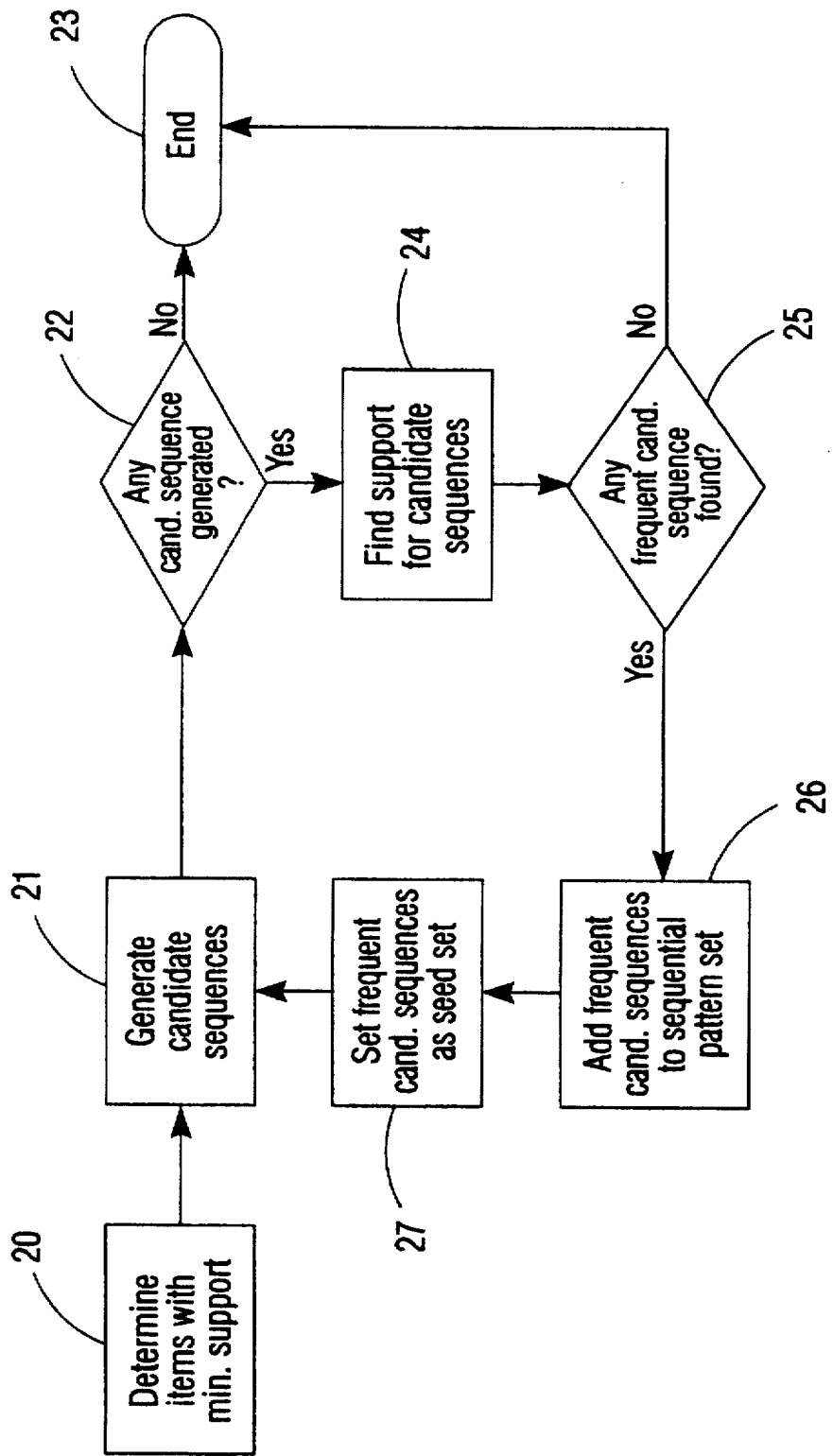
FIG. 3 is a flow chart showing the overall operation of the method of the present invention.

Referring to FIG. 3, the overall operation of the method for mining generalized sequential patterns is shown in the form of a flow chart. Beginning with block 20, the method first determines the data items whose support is equal to or more than a minimum support. Those items are referred to as frequent or large items. The support of an item is defined as the number of data sequences in the database that contain the item. Next, in block 21, candidate sequences are generated using the determined items as a seed set. Each candidate sequence has one more item than the seed sequence. The preferred embodiment for the candidate sequence generation performed in block 21 is shown in FIG. 4 and is described below.

Figure 7:
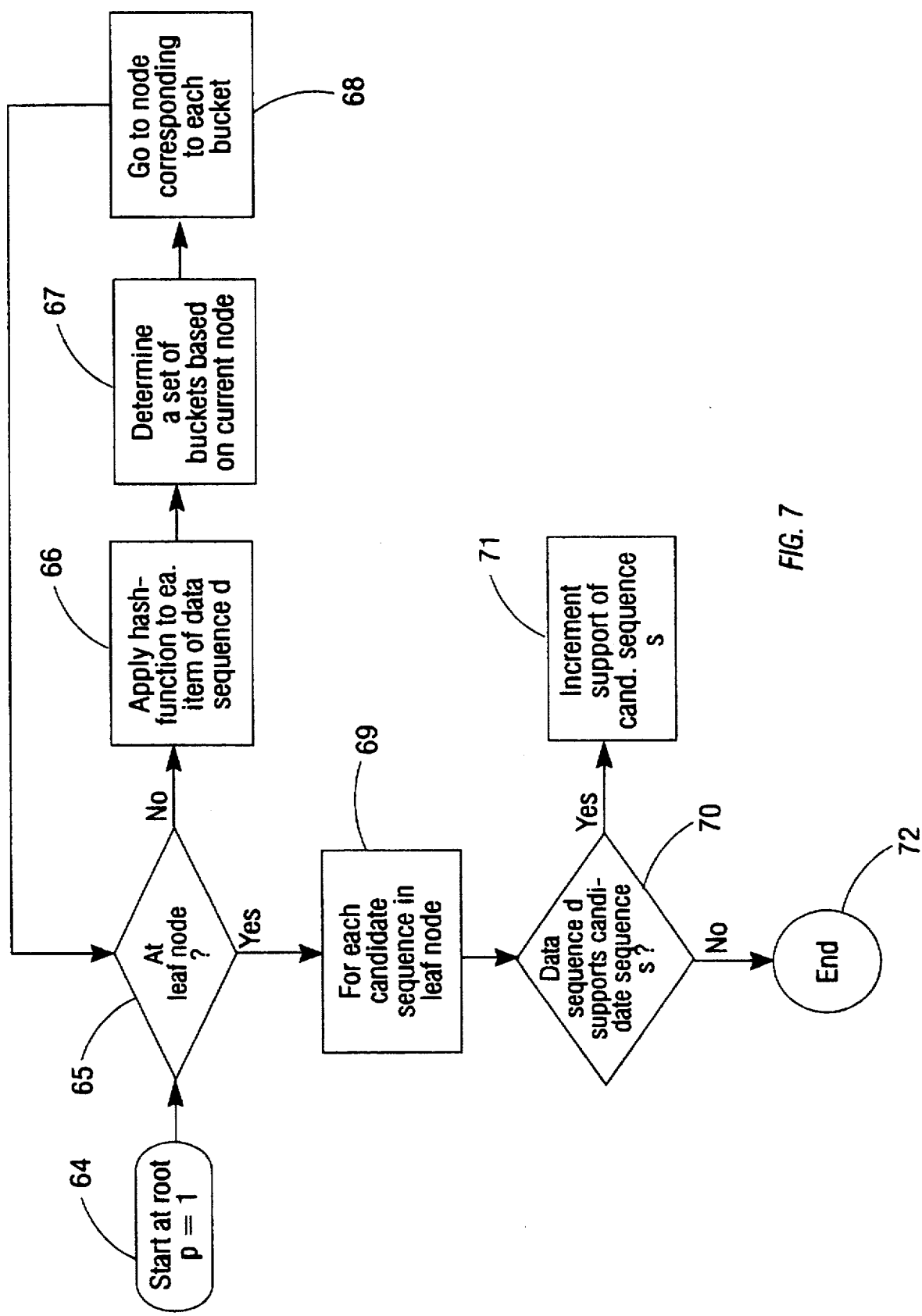
FIG. 7 is a flow chart showing the operation of a preferred embodiment for the step of finding candidate sequences of the hash-tree that are contained in a data sequence.

The method is terminated if no candidate sequences are generated, as shown by decision block 22 and block 23. Otherwise, the method proceeds to block 24 where the support for each candidate sequence is counted by the mining kernel 5 making a pass over the data. A preferred embodiment for counting the support of the candidate sequences is shown in FIG. 7.

Still referring to FIG. 3, at block 25, the frequent candidate sequences are identified. A candidate sequence is considered frequent if its support is equal to or more than a user-specified minimum support. Each such frequent sequence represents a sequential pattern. At block 26, the frequent candidate sequences are added to a set of sequential patterns that will be output as a result. The method is terminated if no frequent candidate sequences are found, as shown by the negative branch from block 25. Furthermore, the frequent candidate sequences just determined are used as the seed, according to be the next candidate sequences, according to block 27. The method continues by repeating itself, starting at block 21.

Figure 4:
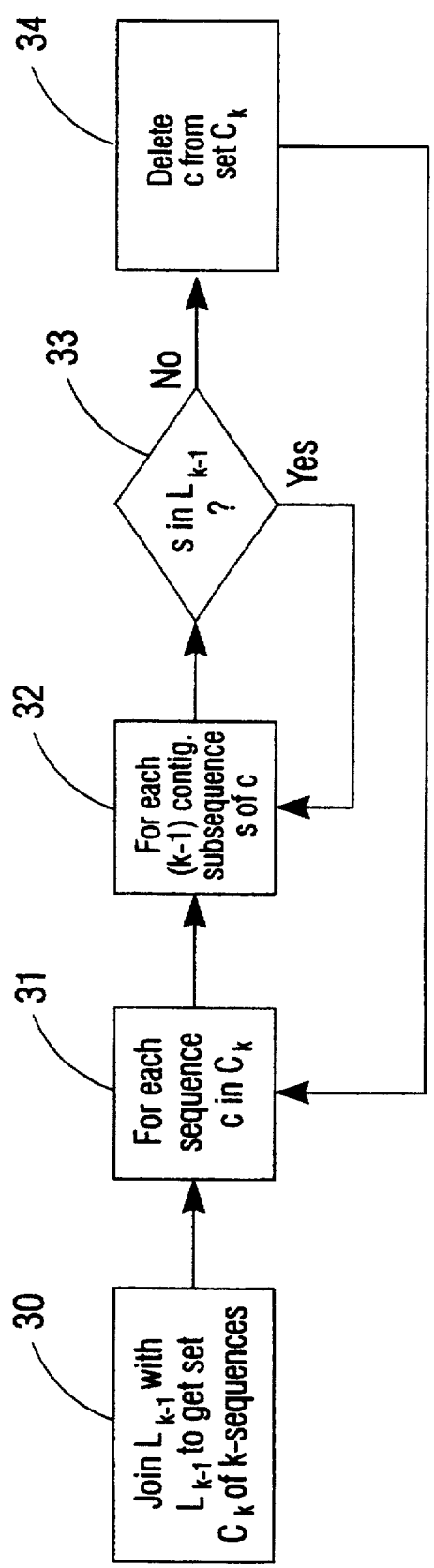
FIG. 4 is a flow chart showing the operation of a preferred embodiment for block 21 of FIG. 3, the candidate sequence generation of the present invention.

FIG. 4 shows a preferred embodiment for block 21, the generation of candidate sequences. This step may be described as generating a superset of the set of all frequent k-sequences, given $L_{k-1}$, the set of all frequent (k-1)-sequences. A k-sequence is a sequence having k items. The notion of a contiguous subsequence is defined as follows. Given a sequence $s=<s_1 s_2 \ldots s_n>$ and a subsequence c, c is a contiguous subsequence of s if any of the following conditions holds: (1) c is derived from s by dropping an item from either element $s_1$ or $s_n$. (2) c is derived from s by dropping an item from an element $s_i$ which has at least two items, and (3) c is a contiguous subsequence of ĉ, and ĉ is a contiguous subsequence of s.

As an example, consider the sequence s=<(1,2) (3,4) (5) (6)>. The sequences<(2) (3,4) (5) (6)>,<(1,2) (3,4) (5)>,< (1,2) (3) (5) (6)> and <(3) (5)> are some of the contiguous subsequences of s. However,<(1,2) (3,4) (6)>,<(1) (5) (6)> and<(3) (6)> are not. One property of contiguous subsequences is that any data sequence that contains a sequence s will also contain any contiguous subsequence of s. If there is no maximum time-gap constraint between adjacent elements of a pattern, the data sequence will contain all subsequences of s, including non-contiguous subsequences.

Still referring to FIG. 4, the generation of candidate sequences has two phases: joining and pruning. At block 30, the candidate sequences are generated by joining $L_{k-1}$ with $L_{k-1}$, where $L_{k-1}$ is the set of all frequent (k-1)-sequences determined from the immediately preceding execution of the method steps. A sequence $s_1$ joins with $S_2$ if the subsequence obtained by dropping the first item of $s_1$ is the same as the subsequence obtained by dropping the last item of $s_2$. The candidate sequence generated by joining $s_1$ with $S_2$ would be $s_1$ extended by the last item in $s_2$. The added item becomes a separate element if it was a separate element in $s_1$, and part of the last element of $s_1$ otherwise.

The pruning phase is represented by blocks 31 through 34 of FIG. 4. In this phase, the candidate k-sequences having a contiguous (k-1)-subsequence are deleted from the set $c_k$ of candidate k-sequences. From the definition of contiguous subsequences above, the contiguous (k-1)-subsequence has a support count that is less than the minimum support. Furthermore, the candidate k-sequences that have any subsequence without minimum support are also deleted from the set $c_k$, if there are no constraints as to the maximum time-gap between adjacent elements of a sequential pattern.

In a preferred embodiment of the invention, the deletion of candidate k-sequences from the set $c_k$ includes determining, at block 33, for each candidate k-sequence c of the set $c_k$ and for each contiguous (k-1)-subsequence s of c, whether the contiguous (k-1)-subsequence s is present in a set $L_{k-1}$ Of all frequent (k-1)-sequences. If s is not present in the set $L_{k-1}$, the candidate k-sequence is deleted from the set $C_k$ of candidate k-sequences, at block 34.

Figure 5:
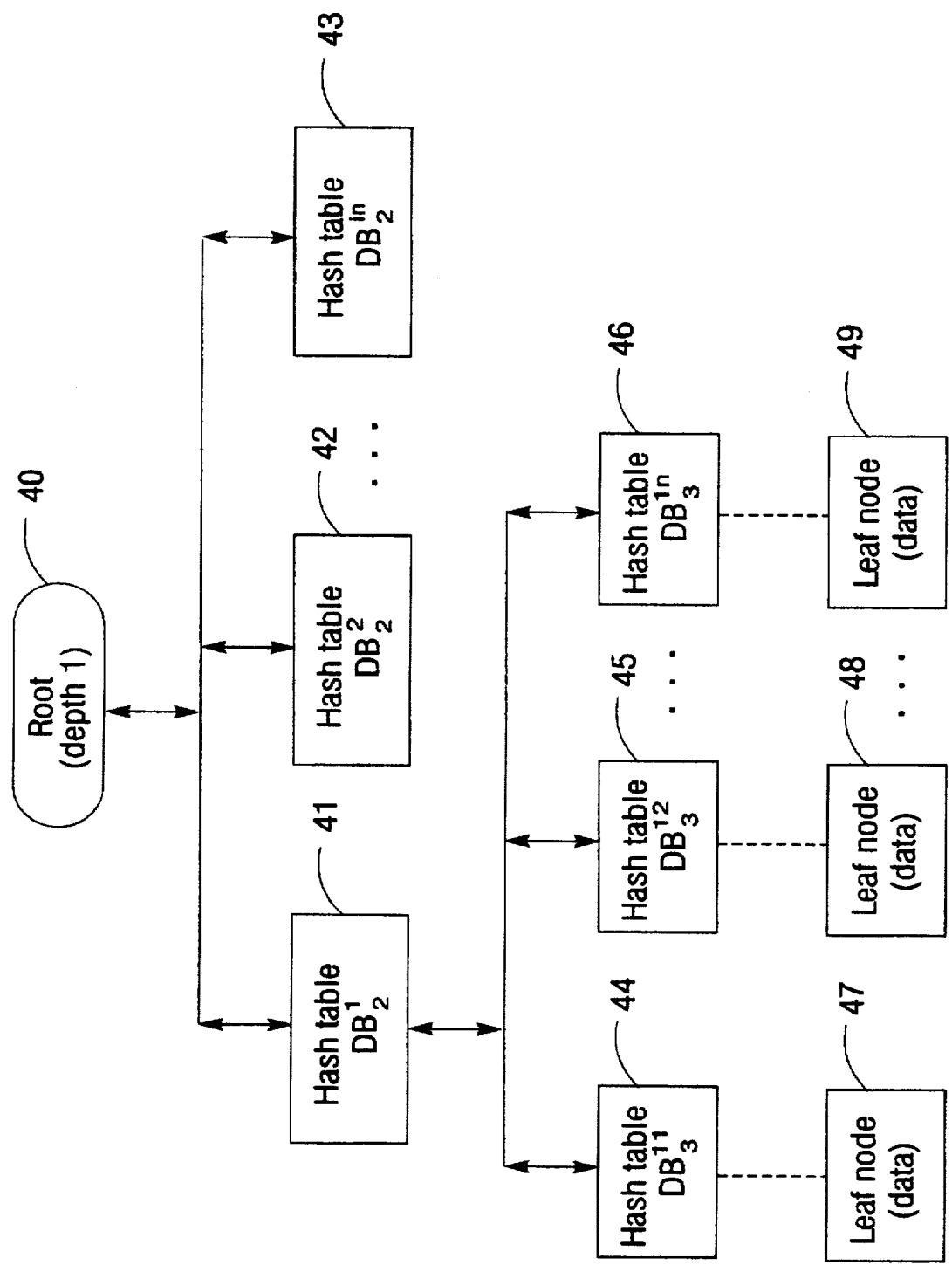
FIG. 5 is a schematic diagram of a typical hash-tree data structure used by the present invention to arrange generated candidate sequences.

FIG. 5 illustrates a typical hash-tree data structure for arranging the candidate sequences once they are generated. Such a data structure is used to allow the candidate sequences supported by a data sequence to be found quickly during the identifying of frequent candidate sequences. The data structure includes a root 40 which is at a depth, i.e., data structure level, equal to one. The hash tree then branches into a plurality of hash table or interior nodes 41, 42, and 43 at depth 2, herein designated as $DB^1_2$, $DB^2_2 \ldots$ and $DB^m_2$.

Each of the interior nodes 41, 42, and 43 represents a hash table used by a hash function and contains one or more buckets. Each bucket in one of the interior nodes 41, 42, and 43 points to a node at depth 3, e.g. one of the nodes 44, 45, 46 which are designated as $DB^{11}_3$, $DB^{12}_3 \ldots DB^{1n}_3$. The branching continues to other interior nodes at a greater depth. Eventually, the hash-tree terminates with the leaf nodes, such as nodes 47, 48, and 49. Each leaf node represents a list of candidate sequences.

Figure 6:
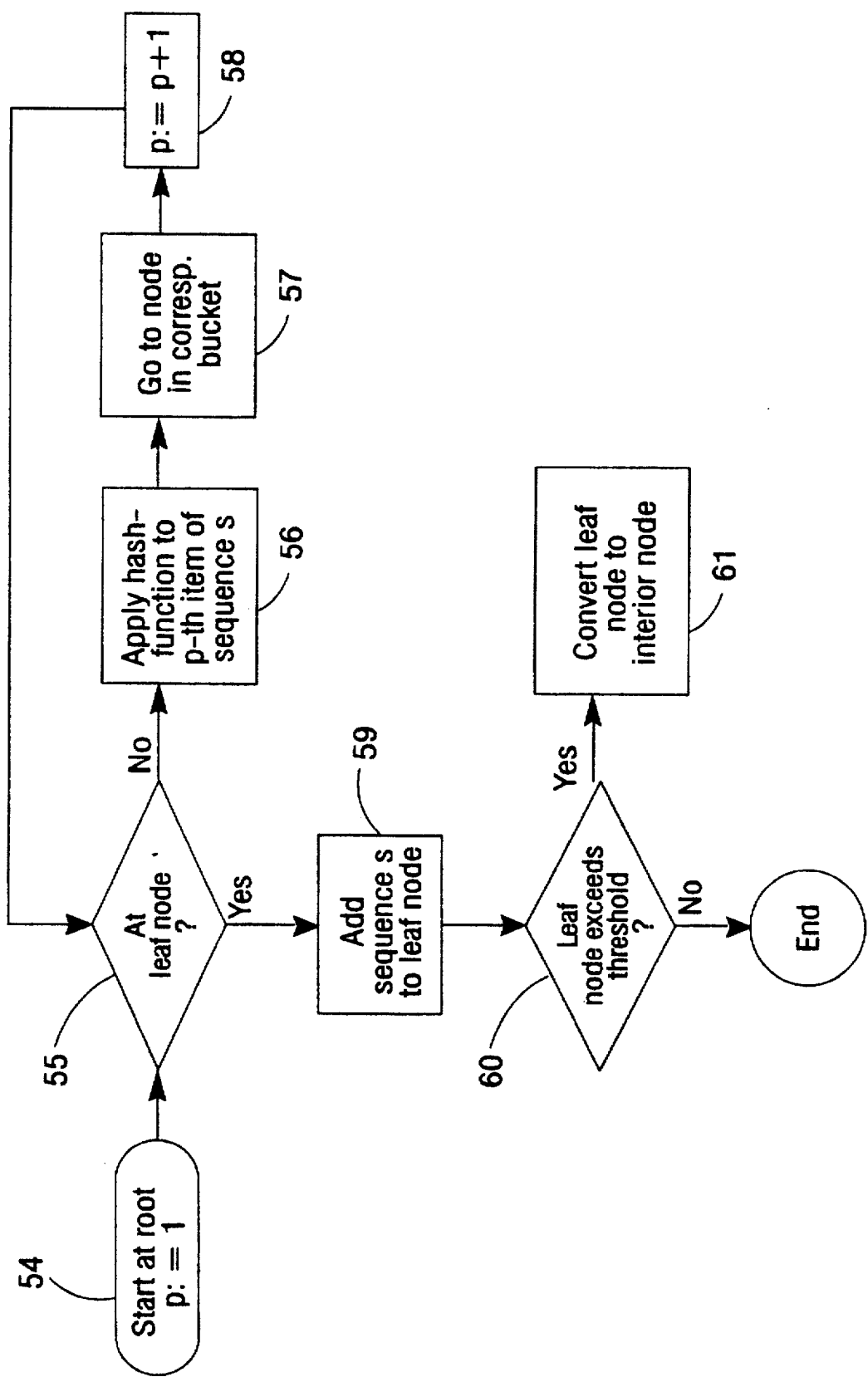
FIG. 6 is a flow chart showing the operation of a preferred embodiment for adding candidate sequences to the hash-tree data structure after they are generated.

In one preferred embodiment of the invention, the method further includes the step of adding to the hash-tree of FIG. 5 each candidate sequence that is generated. FIG. 6 shows the flow chart for a preferred embodiment for such a step. In adding a candidate sequence to the hash-tree, the nodes of the hash-tree are traversed from the root to determine whether a current node is an interior node or leaf node. Starting at block 54, the current node is initially set to the root of the hash-tree which has a depth of one.

If the current node is an interior node, a hash function is applied to the p-th item of the candidate sequence to be added to determine a bucket b in the hash table of the current node, according to block 56. Next, the current node is set to the node in the bucket b, and depth p is incremented by one, as shown by blocks 57 and 58, respectively. The steps are repeated starting with block 54 where the current node is checked to determine if it is an interior one.

If the current node is a leaf node, as shown by the affirmative branch from block 55, the candidate sequence is added to this leaf node, in block 59. Whenever the number of candidate sequences in the leaf node exceeds a predetermined threshold value, the leaf node is converted to an interior node, as shown by blocks 60 and 61. Otherwise, the addition of the candidate sequence to the hash tree data structure is completed.

FIG. 7 is a flow chart showing further details of block 24, FIG. 3, for determining the candidate sequences of the hash-tree that are contained in a data sequence d, when counting the support for the candidate sequences. Starting at block 64, the current node is initially set to the root of the hash-tree. If the current node is an interior node, a hash function is applied to each item of the data sequence d to determine a set of buckets b in the hash table of the current node, according to blocks 66 and 67. Each bucket b corresponds to a node of the hash-tree. Next, for each bucket b, the current node is set to node n in the bucket b, as shown by block 68. The steps are repeated starting with block 65 where the current node is checked to determine if it is an interior node.

If the current node is a leaf node, as shown by the affirmative branch from block 65, the method proceeds to block 69. For each candidate sequence s in the leaf node, a determination as to whether the data sequence d supports the candidate sequence s is performed, as represented by blocks 69 and 70. If the data sequence d supports the candidate sequence s, the support count for the candidate sequence s is incremented by one, at block 71. Otherwise, the process of finding the candidate sequences of the hash tree that are contained in a data sequence d is completed at block 72.

The basic definition for when a data sequence d supports, or contains, a sequence s is described by R. Agrawal and R. Srikant in the "Mining Sequential Patterns" paper. With a taxonomy, the data sequence $d = <d^1 \ldots d_m>$ supports sequence $s = <s_1 \ldots s_n>$ if there exist integers $i_1 < i_2 \ldots i_n$ such that $s_1$ is contained in $d_{i_1}$, $S_2$ is contained in $d_{i_2}$, ..., and $s_n$ is contained in $d_{i_n}$. When a sliding time window is specified, the definition of when a data sequence d supports a sequence s is relaxed by allowing a set of transactions to contain an element of a sequence, as long as the difference in transaction times between the transactions in the set is less than the a user-specified window-size.

With the addition of constraints on the time-gap between adjacent elements of a pattern, a data sequence $d = <d_1 \ldots d_m>$ supports the sequence $S = <s_1 \ldots s_n>$ if there exist integers $I_1 \leq u_1 < I_2 < u_2 < \ldots < I_n \leq u_n$ such that:

(i) $s_i$ is contained in $U_{k=I_i}^{u_i} d_k$, for $1 < i < n$, (ii) transaction-time($d_{u_i}$)-transaction-time($d_{l_i}$)≤window-size, $1 < i < n$, (iii) transaction-time($d_{l_i}$)-transaction-time($d_{u_{i-1}}$)≤ minimum time-gap, $2 \leq i \leq n$, and (iv) transaction-time($d_{u_i}$)-transaction-time($d_{l_{i-1}}$)≤ maximum time-gap, $2 \leq i \leq n$.

Figure 8:
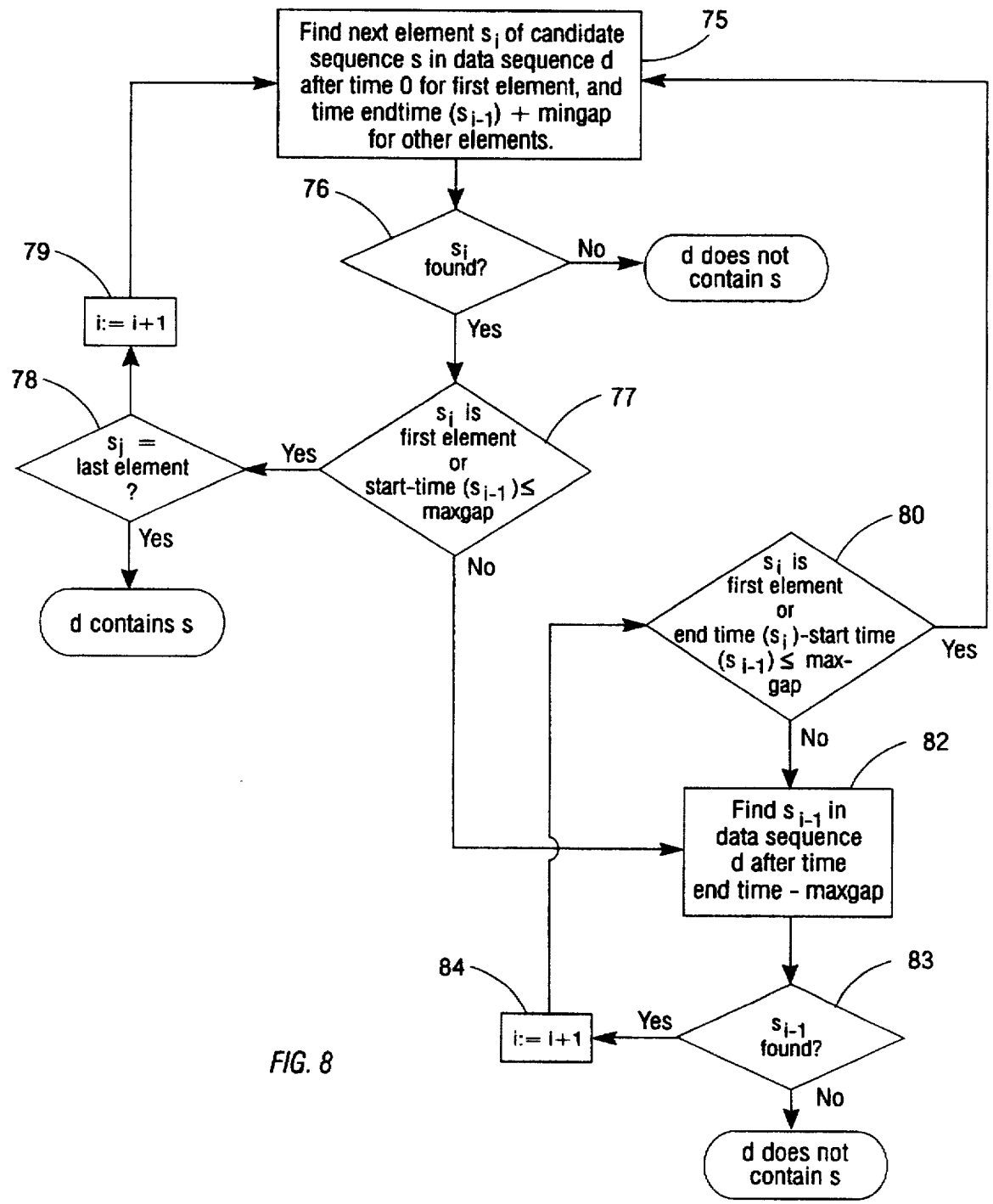
FIG. 8 is a flow chart showing the operation of a preferred embodiment of block 70 in FIG. 7, for determining whether a data sequence supports a candidate sequence.

FIG. 8 shows the preferred method by which the present invention determines whether a data sequence d supports a candidate sequence s, i.e., block 70 of FIG. 7. Let the candidate sequence s be $<s_1 s_2 \ldots s_n>$, where $s_1$ is an element of s, and assuming that a procedure exists for finding the first occurrence of an element of a candidate sequence s in a data sequence d, after a given time t. Such a procedure will be described below, in accordance with FIG. 9. The method for determining whether a data sequence d supports a candidate sequence s typically includes a forward phase and a backward phase. The forward phase begins at block 75 where it finds the next element $s_i$ of the candidate sequence s in the data sequence d after time zero, if it is the first element, and after time end-time($s_{i-1}$) plus minimum time-gap for other elements.

If the element $s_i$ is not found, the data sequence d does not contain the candidate sequence s, as illustrated by the negative branch from decision block 76. If $s_i$ is found, the difference between end-time($s_i$) and start-time($s_{i-1}$) is compared with a user-specified maximum time-gap between adjacent elements of a sequential pattern, according to block 77. End-time($s_i$) denotes the end-time of a just found element while start-time($s_{i-1}$) is the start-time of the element immediately preceding the just found element.

If the difference between end-time($s_i$) and start-time($s_{i-1}$) is less than or equal to the maximum time-gap, or if $s_i$ is the first element of the candidate sequence s, the forward phase proceeds to find the next element of the candidate sequence. Thus, from the affirmative branch of block 77, element $s_i$ is checked whether it is the last element of the candidate sequence s, at block 78. If it is, d is said to support s. Otherwise, the index i is incremented by one in block 79, and block 75 is performed again. In effect, the next element of the candidate sequence s is to be examined.

Still referring to FIG. 8, from the negative branch of block 77, the forward phase switches to the backward phase. At block 82, the method finds the immediately preceding element $s_{i-1}$ of the candidate sequence s in the data sequence d after time equal to end-time($s_i$) minus the maximum time-gap. If the element $s_{i-1}$ is not found, the data sequence d does not contain the candidate sequence s, as illustrated by the negative branch from block 83. If $s_{i-1}$ is found, the index i is incremented by one in block 84. When it is determined that the first element of the candidate sequence is reached, the backward phase switches to the forward phase, as shown by the affirmative branch from block 80. Also at block 80, the difference between end-time($s_i$) and start-time($s_{i-1}$) is compared with the user-specified maximum time-gap. If this difference is more than the maximum time-gap, the backward phase is repeated for finding the next preceding element of the candidate sequence s, at block 82. Otherwise, the backward phase returns to the forward phase. The process thus continues by switching between the forward and backward phases until all the elements of the candidate sequence s are found in the data sequence d, if at all.

Figure 9:
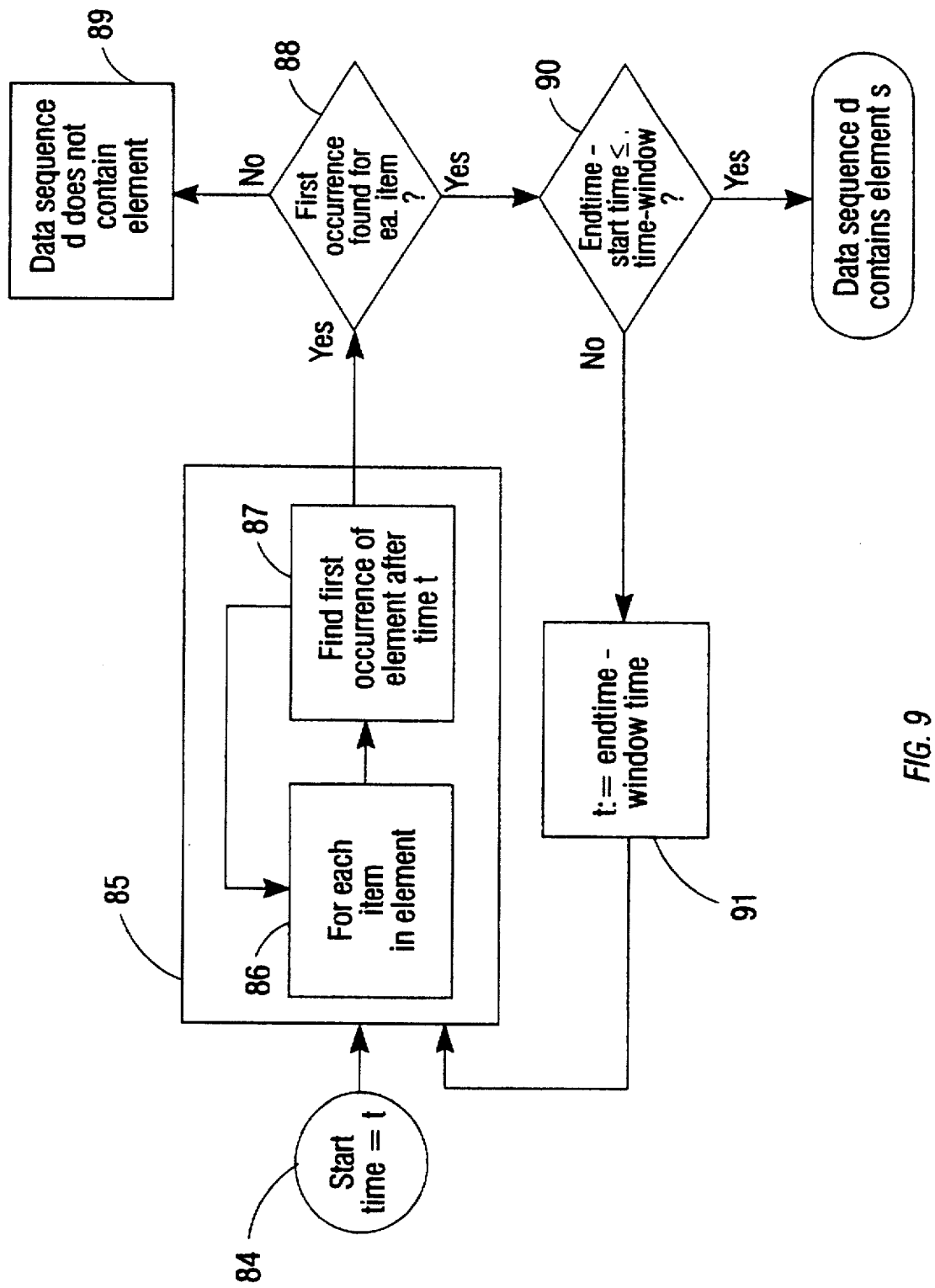
FIG. 9 is a flow chart showing the operation of a preferred embodiment for finding a single element in a data sequence, which corresponds to blocks 75 or 82 of FIG. 8.

FIG. 9 shows the flow chart for a preferred embodiment of the procedure for finding a single element $s_i$ in a data sequence d. Such a procedure is used in blocks 75 and 82 of FIG. 8. The procedure begins at block 84 with a starting time t. For each item of the element $s_i$, the procedure finds the first occurrence of the item in the data sequence d after time t, as shown by block 85. In further detail, block 85 includes blocks 86 and 87 and is typically implemented as a FOR loop in many computer programming languages. At block 88, the procedure determines if the first occurrence for each item is found. If the first occurrence for any of the items is not found, the data sequence d does not contain the element $s_i$ after time t, as represented by block 89.

Otherwise, the method continues at block 90 where the difference between the end-time and start-time of the element $s_i$ is compared to a user-specified sliding time window. If this difference is less than or equal to the window, the data sequence d contains element $s_i$, as shown by the affirmative branch from block 90. Otherwise, time t is set equal to the end-time of element $s_i$ minus the time window in block 91. The procedure is then repeated starting from block 85.

Figure 10:
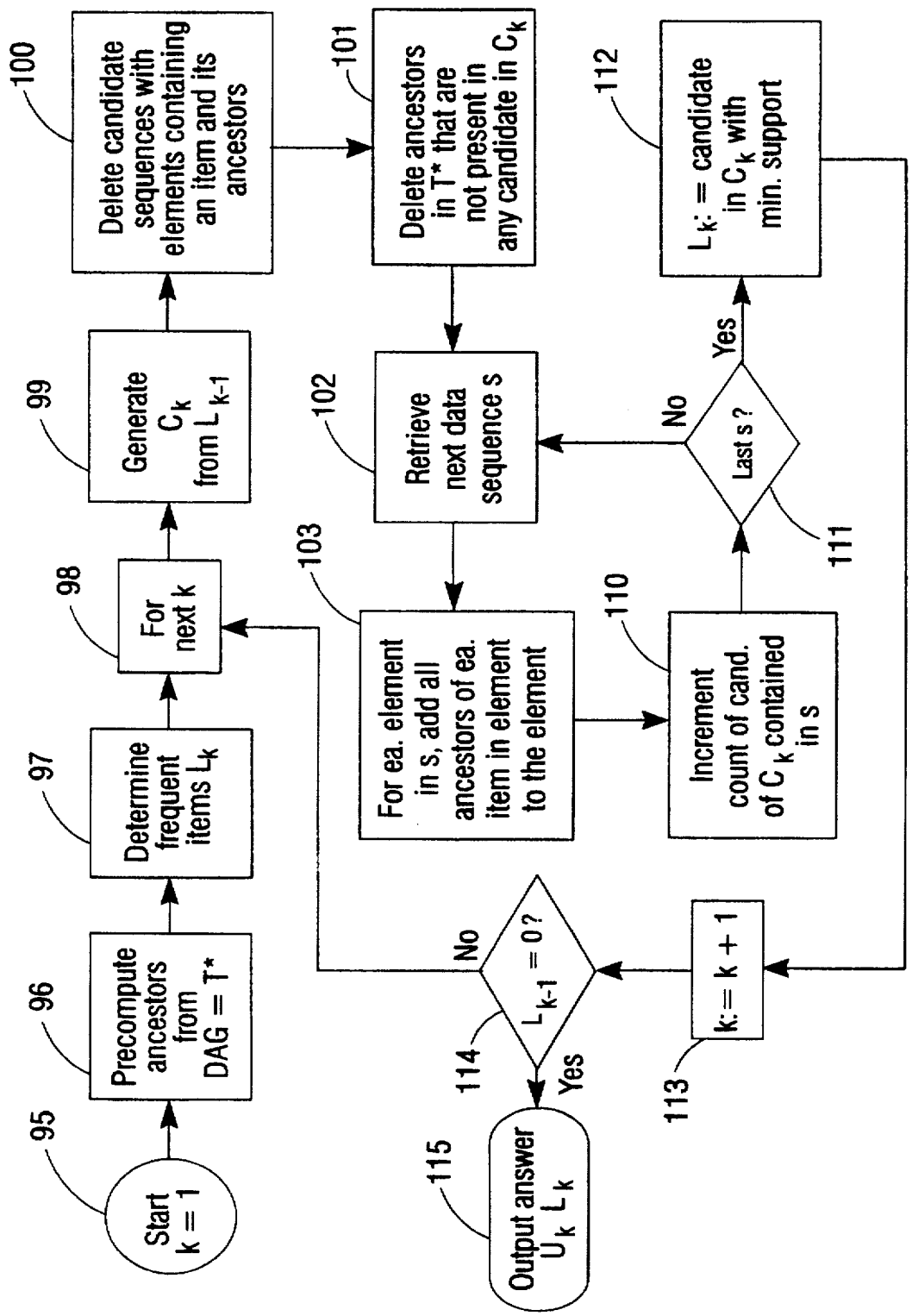
FIG. 10 is a flow chart showing the operation of a preferred embodiment for identifying generalized sequential patterns in a large database across levels of a taxonomy, when such a taxonomy exists.

FIG. 10 shows the operation of a preferred embodiment for the method for determining sequential patterns when a taxonomy exists. At block 95, the process starts with the mining kernel making the first pass over the data, i.e., for k=1. Block 96 shows the first optimization wherein the ancestors for each item in the taxonomy are precomputed and added to a set of precomputed ancestors. The notations T and T' are used to denote the taxonomy and the set of precomputed ancestors, respectively. The optimization steps are preformed in lieu of finding the ancestors for each item on the fly by traversing the taxonomy T multiple times. Next, the set $L_k$ of frequent items is determined at block 97, and an iteration for each $k \geq 2$ is commenced at block 98.

Frequent (or large) items are those items in the database whose support is more than a minimum support. The methods for determining frequent items, as shown in block 97, are disclosed, for example, in the following publications and are incorporated herein by reference: Agrawal et al., "*Mining Association Rules Between Sets of Items in Large Databases*," Proc. of the ACM SigMod Conference on Management of Data, Washington, D.C. 1993; Agrawal et al., "*Fast Algorithms For Mining Association Rules*," Proc. of the Very Large Databases Conference, Santiago, Chile 1994; Houtsma et al., "*Set-Oriented Mining of Association Rules*," IBM Research Report RJ 9567, October 1993.

At block 99, which is similar to block 21 of FIG. 3, set $C_k$ of candidate sequences is generated from $L_{k-1}$, the set of frequent items, using the steps of the process shown in FIG. 4. As part of a first optimization, in block 100, every candidate sequence in the set $C_k$ which contains both an item and the ancestor of the item is deleted from $C_k$. Furthermore, in block 101, all ancestors in the set T' that are not present in any candidate sequences of $C_k$ are deleted from T'. The process then proceeds to block 102 where the next data sequence s is retrieved from the database. Block 103 represents a second optimization and is shown in more detail in FIG. 11. In the second optimization, for each element in the data sequence s, all the ancestors of each item in the element are added to the element. Next, in block 110, the count of candidate sequences in $C_k$ that are contained in the data sequence s is incremented by one.

At block 111, if s is not the last data sequence in the database, the next data sequence is then retrieved from the database and the second optimization is repeated for s. If s is the last data sequence, the method proceeds to block 112 where the candidate sequences in $C_k$ with minimum support, i.e., the frequent candidate sequences, become the next seed set $L_k$. The seed set $L_k$ is used for generating the next group of candidate sequences, as shown by the negative branch from block 114. If no frequent candidate sequences are found, i.e., when $L_{k-1}=0$, the sets of frequent candidate sequences are output as the sequential patterns, according to block 115.

Figure 11:
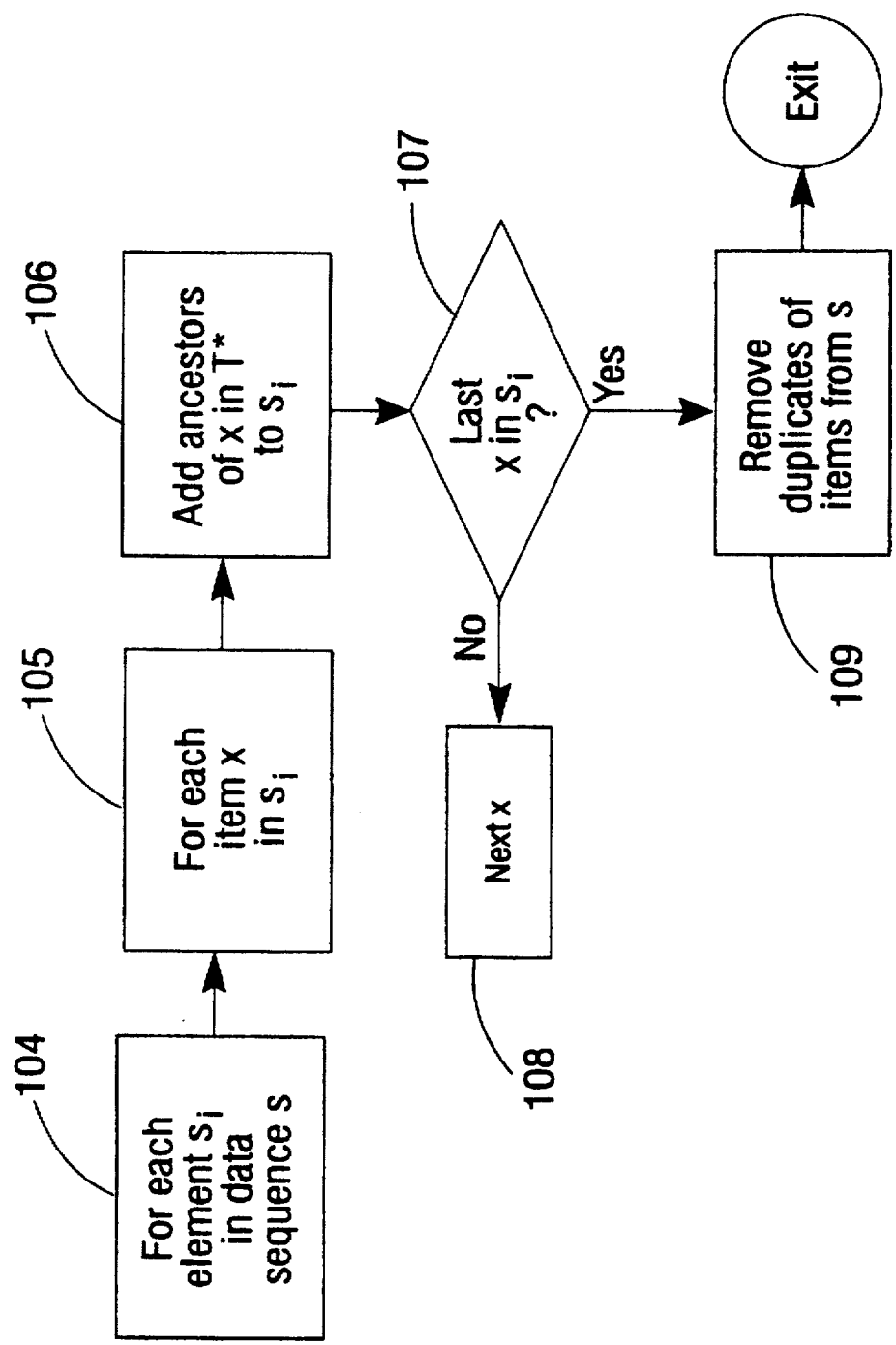
FIG. 11 is a flow chart showing further details of the step of adding all the ancestors of each item of an element to the element, which corresponds to block 103 of FIG. 10.

FIG. 11 shows the details of the second optimization, block 103 of FIG. 10. Starting at block 104, for each element $s_i$ in each data sequence s and for each item x in the element $s_i$, the ancestors of the item x present in the set T' of predetermined ancestors are added to the element $s_i$, per block 106. The item x is checked to determine if it is the last item in element $s_i$, at block 107. If x is not the last item, the step of adding the ancestor is repeated for the next item of the element, as shown by block 108. Otherwise, the method proceeds to block 109 where duplicate entries are removed from the element $s_i$ under test.

Figure 12:
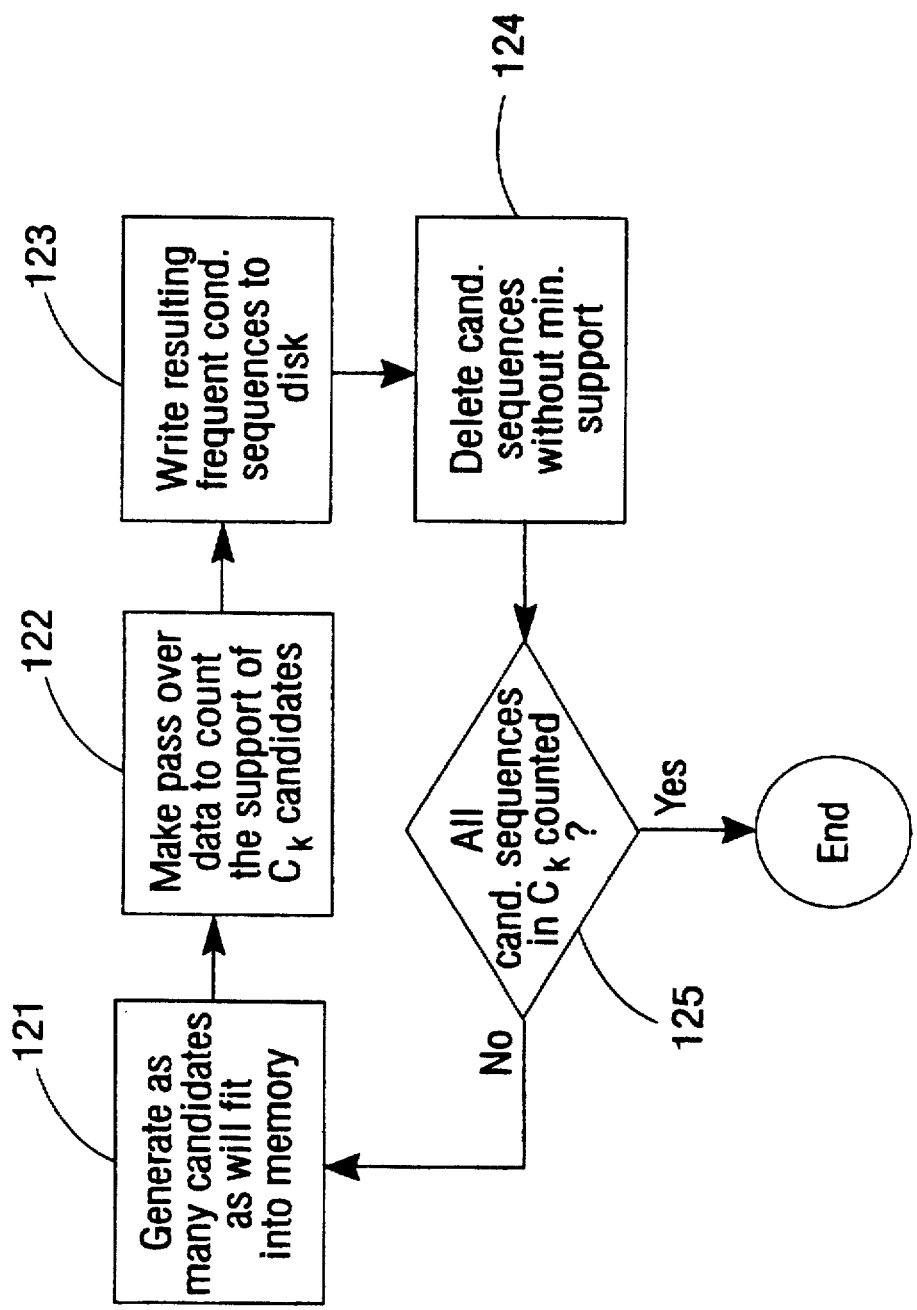
FIG. 12 is a flow chart showing the method for managing the data storage areas during the steps of generating candidate sequences and counting their support.

FIG. 12 is a flow chart showing the operation of a preferred embodiment for managing the data storage areas of the system 2 during the generation of candidate sequences, in accordance with the present invention. The system 2 has a memory for temporarily storing candidate sequences and frequent candidate sequences during their generation. The storage management method is applicable when the whole set $C_k$ of candidate sequences does not fit into the available memory. Starting at block 121, as many candidate sequences are generated as they will fit into the memory. The mining kernel 5 then makes a pass over the data to count the support for the generated candidate sequences, as usual, in block 122.

The method further includes writing the identified frequent candidate sequences into a data storage area, such as a disk, in block 123. In addition, the candidate sequences without minimum support are deleted from the memory to increase its available space, at block 124, after counting the support for the candidate sequences. The method continues to generate as many candidates as they will fit into the memory, until all candidate sequences in $C_k$ have been counted (block 125).

In still another aspect of the present invention, a computer program product for use with a computer system and for mining generalized sequential patterns from a large database is disclosed. The computer program product includes a recording medium, means recorded on the recording medium for instructing the product to perform the steps of the methods described above.

In yet another aspect of the present invention, a database mining system is disclosed for discovering generalized sequential patterns in a large database of transactions. The mining system includes means for determining items with at least a minimum support, and means for generating candidate sequences from a seed set comprising the items with at least minimum support. In addition, the system includes means for identifying frequent candidate sequences and adding them to a set of sequential patterns, and means for repeating the operation of the system until no candidate sequences are generated or no frequent sequences are found.

In a preferred embodiment of the invention, the system further includes means for joining previously found frequent candidate sequences according to a predetermined scheme in generating the next candidate sequences. The system further has means for discarding any candidate sequence having a contiguous subsequence with less than the minimum support. Preferably, the discarding means includes means for deleting any candidate k-sequence having a contiguous (k-1)-subsequence that is not present in the set of all frequent (k-1)-sequences.

In another aspect of the invention, the system includes means for storing the candidate sequences in a hash-tree data structure so that frequent candidate sequences can be found quickly, and means for adding the candidate sequences to the hash-tree. In a preferred embodiment of the system, it further has means for finding the candidate sequences in the hash-tree that are contained in a data sequence. The means for adding and finding candidate sequences includes means for traversing the tree and applying a hash-function to an item in the current node.

In another preferred embodiment, the means for finding the candidate sequences includes means for determining whether a data sequence supports a candidate sequence. This means for determining has a forward phase for finding successive elements of the candidate sequence in the data sequence, and a backward phase for finding preceding elements. The determining means switches back and forth between the forward and backward phases until all the elements of the candidate sequence are found in the data sequence.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for identifying sequential patterns in data sequences stored in a database, each data sequence having a plurality of temporally-spaced transactions, each transaction being characterized by one or more items, the items having a taxonomy which defines descendant and ancestor relationships between the items, the method comprising the steps of:

determining the items having at least a minimum support, the support of an item being a number of data sequences that contain the item, the determined items initially making up a seed set;

generating candidate sequences, if any, from the seed set;

counting the support for the candidate sequences;

identifying those candidate sequences which are frequent, if any, a candidate sequence being frequent if it has at least the minimum support;

adding the frequent candidate sequences to an output set of sequential patterns; and repeating the method steps starting with the generating step, using the just identified frequent candidate sequences as the seed set, until no candidate sequences are generated or no frequent candidate sequences are identified.

2. The method as recited in claim 1, wherein the step of generating candidate sequences includes the steps of:

joining the sequences of the seed set to generate a next set of candidate sequences; and discarding any candidate sequence having a contiguous subsequence with less than the minimum support.

3. The method as recited in claim 2, wherein the seed set includes a set $C_k$ of candidate k-sequences, k being a number of items in each candidate k-sequence; and the step of discarding includes:

deleting from the set $C_k$ any candidate k-sequence that has a contiguous (k-1)-subsequence, the contiguous (k-1)-subsequence having a support less than the minimum support; and deleting from the set $C_k$ any candidate k-sequence that has a subsequence with less than the minimum support, if there are no constraints on a time-gap between adjacent elements of a sequential pattern.

4. The method as recited in claim 3, wherein each step of deleting comprises the steps of:

for each candidate k-sequence c of the set $C_k$ and for each contiguous (k-1)-subsequence s of c, determining whether the contiguous (k-1)-subsequence s is present in a set $L_{k-1}$ of all frequent (k-1)-sequences; and deleting the candidate k-sequence c from the set $C_k$, if the contiguous (k-1)-subsequence s is not present in the set $L_{k-1}$.

5. The method as recited in claim 1, wherein the generated candidate sequences are organized using a hash-tree data structure, thereby permitting the candidate sequences supported by a data sequence d to be found quickly during the step of identifying, the hash-tree having a root, a plurality of interior nodes, and a plurality of leaf nodes, each interior node representing a hash table having a plurality of buckets, each leaf node representing a list of candidate sequences; and the method further comprises the steps of:

adding a candidate sequence to the hash-tree after the candidate sequence is generated; and finding the candidate sequences of the hash-tree that are contained in the data sequence d, when counting the support for the candidate sequences.

6. The method as recited in claim 5, wherein the step of adding a candidate sequence comprises the steps of:

initializing a current node to be the same as the root of the hash-tree, the current node having a depth p equal to one;

if the current node is one of the interior nodes, applying a hash function to a p-th item of the candidate sequence to determine a bucket b in the hash table of the current node, the bucket b corresponding to a node of the hash-tree;

setting the current node to the node corresponding to the bucket b, and incrementing the depth p by one; and repeating the steps of applying, setting, and incrementing, as long as the current node is an interior node;

if the current node is one of the leaf nodes, adding the candidate sequence to the current node; and converting the current node to an interior node if the number of candidate sequences in the current node exceeds a predetermined threshold.

7. The method as recited in claim 5, wherein the step of finding the candidate sequences comprises the steps of:

initializing a current node to be the same as the root of the hash-tree;

if the current node is one of the interior nodes, applying a hash function to each item of the data sequence d to determine a set of buckets in the hash-table of the current node, each bucket b of the set of buckets corresponding to a node of the hash-tree;

for each bucket b in the set of buckets, setting the current node to the node corresponding to the bucket b; and repeating the steps of applying and setting as long as the current node is an interior node;

if the current node is one of the leaf nodes, for each candidate sequence s in the current node, determining whether the data sequence d supports the candidate sequence s; and incrementing a count of the candidate sequence s, if s is supported by the data sequence d.

8. The method as recited in claim 7, wherein the step of determining whether the data sequence d supports the candidate sequence s comprises a forward phase and a backward phase;

the forward phase includes the steps of:

finding successive elements $s_i$ of the candidate sequence s in the data sequence d, as long as the difference between end-time($s_i$) and start-time($s_{i-1}$) is less than or equal to a maximum time-gap between adjacent elements of a sequential pattern, end-time($s_i$) being an end-time of a just found element and start-time($s_{i-1}$) being a start-time of an element preceding the just found element, whereby the data sequence d does not contain the candidate sequence s if no element $s_i$ of s is found in d; and switching to the backward phase if $s_i$ is not a first element of s, and the difference between end-time($s_i$) and start-time($s_{i-1}$) is more than the maximum time-gap; and the backward phase includes the steps of:

finding preceding elements $s_{i-1}$ of the candidate sequence s in the data sequence d, after time end-time($s_i$) minus the maximum time-gap, as long as the difference between end-time($s_i$) and start-time($s_{i-1}$) is more than the maximum time-gap; and switching to the forward phase if the just found element is the first element of s or if the difference between end-time($s_i$) and start-time($s_{i-1}$) is equal to or less than the maximum time-gap.

9. The method as recited in claim 8, wherein the step of finding successive elements comprises the steps of:

starting at a time t, for each item of an element of the candidate sequence s, finding a first occurrence of the item in the data sequence d after time t;

if the first occurrence for any item of the element is not found, concluding that the element is not contained in the data sequence d after time t;

if the first occurrence for each item of the element is found, comparing the difference between an end-time and a start-time of the element with a time window;

if the difference between the end-time and the start-time of the element is equal to or less than the time window, concluding that the element is present in the data sequence d, otherwise, setting time t equal to the end-time of the element minus the time window; and repeating the method steps, starting with the step of finding a first occurrence, for the next item of the element.

10. The method as recited in claim 1, wherein the taxonomy is a directed acyclic graph (DAG) taxonomy, the DAG taxonomy having a plurality of vertexes and a plurality of edges, each edge connecting a pair of vertexes, and each vertex corresponding to an item.

11. The method as recited in claim 10, wherein each data sequence is replaced by an extended data sequence, the extended data sequence including transactions which have all the items in corresponding transactions of the data sequence, and all the ancestors of all the items in the corresponding transactions.

12. The method as recited in claim 11 further comprising the steps of:

accessing the DAG taxonomy to predetermine the ancestors of each item before each generation of candidate sequences; and deleting any predetermined ancestor which is not in any of the candidate sequences being counted.

13. The method as recited in claim 12 further comprising the step of deleting any generated candidate sequence which has an element containing both an item and an ancestor of the item.

14. The method as recited in claim 12, wherein the step of accessing includes adding the predetermined ancestors of the item to a set of predetermined ancestors; and the method further comprises the steps of:

for each element $s_i$ in each data sequence s, and for each item x in the element $s_i$, adding the ancestors of the item x which are present in the set of predetermined ancestors to the element $s_i$; and removing duplicates of items in $s_i$ from each element $s_i$ of the data sequence s, prior to counting the support for the candidate sequences.

15. The method as recited in claim 1, wherein the step of generating candidate sequences includes generating as many candidate sequences as they will fit into a temporary data memory; and the method further comprises the steps, performed after the step of counting, of:

writing the found frequent candidate sequences into a data storage area; and deleting from the temporary data memory the candidate sequences without minimum support.

16. A computer program product for use with a computer system for mining generalized sequential patterns, the system having a database of data sequences, each data sequence having a plurality of temporally-spaced transactions, each transaction being characterized by one or more items, the items having all taxonomy which defines descendant and ancestor relationships between the items, the computer program product comprising:

a recording medium;

means, recorded on the recording medium, for directing the computer system to determine the items having at least a minimum support, the support of an item being a number of data sequences that contain the item, the determined items initially making up a seed set;

means, recorded on the recording medium, for directing the computer system to generate candidate sequences, if any, from the seed set;

means, recorded on the recording medium, for directing the computer system to count the support for the candidate sequences;

means, recorded on the recording medium, for directing the computer system to identify those candidate sequences which are frequent, if any, a candidate sequence being frequent if it has at least the minimum support;

means, recorded on the recording medium, for adding the frequent candidate sequences to an output set of sequential patterns; and means, recorded on the recording medium, for directing the computer system to repeat the operation of the computer program product, using the just identified frequent candidate sequences as the seed set, until no candidate sequences are generated or no frequent candidate sequences are identified.

17. The computer program product as recited in claim 16, wherein the means for directing to generate candidate sequences includes means, recorded on the recording medium, for directing the computer system to:

join the sequences of the seed set to generate a next set of candidate sequences; and discard any candidate sequence having a contiguous subsequence with less than the minimum support.

18. The computer program product as recited in claim 17, wherein the seed set includes a set $C_k$ of candidate k-sequences, k being a number of items in each candidate k-sequence; and the means for directing to discard includes means, recorded on the recording medium, for directing the computer system to:

delete from the set $C_k$ any candidate k-sequence that has a contiguous (k-1)-subsequence, the contiguous (k-1)-subsequence halving a support less than the minimum support; and delete from the set $C_k$ any candidate k-sequence that has a subsequence with less than the minimum support, if there are no constraints on a time-gap between adjacent elements of a sequential pattern.

19. The computer program product as recited in claim 18, wherein the means for directing to delete comprises means, recorded on the recording medium, for directing the computer system to:

determine, for each candidate k-sequence c of the set $C_k$ and for each contiguous (k-1)-subsequence s of c, whether the contiguous (k-1)-subsequence s is present in a set $L_{k-1}$ of all frequent (k-1)-sequences; and delete the candidate k-sequence c from the set $C_k$, if the contiguous (k-1)subsequence subsequence s is not present in the set $L_{k-1}$.

20. The computer program product as recited in claim 16, wherein the generated candidate sequences are organized using a hash-tree data structure, thereby permitting the candidate sequences supported by a data sequence d to be found quickly during the step of identifying, the hash-tree having a root, a plurality of interior nodes, and a plurality of leaf nodes, each interior node representing a hash table having a plurality of buckets, each leaf node representing a list of candidate sequences; and the computer program product further comprises:

means, recorded on the recording medium, for directing the computer system to add a candidate sequence to the hash-tree after the candidate sequence is generated; and means, recorded on the recording medium, for directing the computer system to find the candidate sequences of the hash-tree that are contained in the data sequence d, when counting the support for the candidate sequences.

21. The computer program product as recited in claim 20, wherein the means for directing to add a candidate sequence comprises means, recorded on the recording medium, for directing the computer system to:

initialize a current node to be the same as the root of the hash-tree, the current node having a depth p equal to one;

if the current node is one of the interior nodes, perform the steps of:

applying a hash function to a p-th item of the candidate sequence to determine a bucket b in the hash table of the current node, the bucket b corresponding to a node of the hash-tree;

setting the current node to the node corresponding to the bucket b, and incrementing the depth p by one; and repeating the steps of applying, setting, and incrementing, as long as the current node is an interior node;

if the current node is one of the leaf nodes, add the candidate sequence to the current node; and convert the current node to an interior node if the number of candidate sequences in the current node exceeds a predetermined threshold.

22. The computer program product as recited in claim 20, wherein the means for directing to find the candidate sequences comprises means, recorded on the recording medium, for directing the computer system to:

initialize a current node to be the same as the root of the hash-tree;

if the current node is one of the interior nodes, perform the steps of:

applying a hash function to each item of the data sequence d to determine a set of buckets in the hash-table of the current node, each bucket b of the set of buckets corresponding to a node of the hash-tree;

for each bucket b in the set of buckets, setting the current node to the node corresponding to the bucket b; and repeating the steps of applying and setting as long as the current node is an interior node;

if the current node is one of the leaf nodes, determine, for each candidate sequence s in the current node, whether the data sequence d supports the candidate sequence s; and increment a count of the candidate sequence s, if s is supported by the data sequence d.

23. The computer program product as recited in claim 22, wherein the means for directing to determine whether the data sequence d supports the candidate sequence s comprises a forward phase and a backward phase;

the forward phase includes:

means, recorded on the recording medium, for directing the computer system to find successive elements $s_i$ of the candidate sequence s in the data sequence d, as long as the difference between end-time($s_i$) and start-time($s_{i-1}$) is less than or equal to a maximum time-gap between adjacent elements of a sequential pattern, end-time($s_i$) being an end-time of a just found element and start-time($s_{i-1}$) being a start-time of an element preceding the just found element, whereby the data sequence d does not contain the candidate sequence s if no element $s_1$ of s is found in d; and means, recorded on the recording medium, for directing the computer system to switch to the backward phase if $s_i$ is not a first element of s and the difference between end-time($s_i$) and start-time($s_{i-1}$) is more than the maximum time-gap;

the backward phase includes:

means, recorded on the recording medium, for directing the computer system to find preceding elements $s_{i-1}$ of the candidate sequence s in the data sequence d, after time end-time($s_i$) minus the maximum time-gap, as long as the difference between end-time($s_i$) and start-time($s_{i-1}$) is more than the maximum time-gap; and means, recorded on the recording medium, for directing the computer system to switch to the forward phase if the just found element is the first element of s, or if the difference between end-time($s_i$) and start-time ($s_{i-1}$) is equal to or less than the maximum time-gap.

24. The computer program product as recited in claim 23, wherein the means for directing to find successive elements comprises means, recorded on the recording medium, for directing the computer system to perform the steps of:

finding, starting at a time t, for each item of an element of the candidate sequence s, a first occurrence of the item in the data sequence d after time t, if the first occurrence for any item of the element is not found, concluding that the element is not contained in the data sequence d after time t, if the first occurrence for each item of the element is found, comparing the difference between an end-time and a start-time of the element to a time window;

if the difference between the end-time and the start-time of the element is equal to or less than the time window, concluding that the element is present in the data sequence d, otherwise, setting time t equal to the end-time of the element minus the time window; and repeating the steps, starting with the step of finding a first occurrence, for the next item of the element.

25. The computer program product as recited in claim 16, wherein the taxonomy is a directed acyclic graph (DAG) taxonomy, the DAG taxonomy having a plurality of vertexes and a plurality of edges, each edge connecting a pair of vertexes, and each vertex corresponding to an item.

26. The computer program product as recited in claim 25, wherein each data sequence is replaced by an extended data sequence, the extended data sequence including transactions which have all the items in corresponding transactions of the data sequence, and all the ancestors of all the items in the corresponding transactions.

27. The computer program product as recited in claim 26 further comprising:

21 means, recorded on the recording medium, for directing the computer system to access the DAG taxonomy to predetermine the ancestors of each item before each generation of candidate sequences;

means, recorded on the recording medium, for directing the computer system to delete any predetermined ancestor which is not in any of the candidate sequences being counted.

28. The computer program product as recited in claim 27 further comprising means, recorded on the recording medium, for directing the computer system to delete any generated candidate sequence which has an element containing both an item and an ancestor of the item.

29. The computer program product as recited in claim 27, wherein the means for directing to access includes means, recorded on the recording medium, for directing the computer system to add the predetermined ancestors of the item to a set of predetermined ancestors;

the computer program product further comprises:

means, recorded on the recording medium, for directing the computer system to add, for each element $s_i$ in each data sequence s and for each item x in the element $s_i$, the ancestors of the item x which are present in tile set of predetermined ancestors to the element $s_i$; and means, recorded on the recording medium, for directing the computer system to remove duplicates of items in $s_i$ from each element $s_j$ of the data sequence s, prior to counting the support for the candidate sequences.

30. The computer program product as recited in claim 16, wherein as many candidate sequences as they will fit into a temporary data memory are generated during the operation of the means for directing to generate candidate sequences; and the computer program product further comprises:

means, recorded on the recording medium, for directing the computer system to write the found frequent candidate sequences into a data storage area; and means, recorded on the recording medium, for directing the computer system to delete from the temporary data memory the candidate sequences without minimum support.

31. A computer-based system for discovering sequential patterns in a database of data sequences, each data sequence having a plurality of temporally-spaced transactions, each transaction being characterized by one or more items, the items having a taxonomy which defines descendant and ancestor relationships between the items, the system comprising:

means for determining the items having at least a minimum support, the support of an item being a number of data sequences that contain the item, the determined items initially making up a seed set;

means for generating candidate sequences, if any, from the seed set;

means for counting the support for the candidate sequences;

means for identifying the candidate sequences which are frequent, if any, a candidate sequence being frequent if it has at least the minimum support;

means for adding the frequent candidate sequences to an output set of sequential patterns; and means for repeating the operation of the system, using the just identified frequent candidate sequences as the seed set, until no candidate sequences are generated or no frequent candidate sequences are identified.

32. The system as recited in claim 31, wherein the means for generating candidate sequences includes:

means for joining the sequences of the seed set to generate a next set of candidate sequences; and means for discarding any candidate sequence having a contiguous subsequence with less than the minimum support.

33. The system as recited in claim 32, wherein the seed set includes a set $C_k$ of candidate k-sequences, k being a number of items in each candidate k-sequence; and the means for discarding includes:

means for deleting from the set $C_k$ any candidate k-sequence; that has a contiguous (k-1)-subsequence, the contiguous (k-1)-subsequence having a support less than the minimum support; and means for deleting from the set $C_k$ any candidate k-sequence; that has a subsequence with less than the minimum support, if there are no constraints on a time-gap between adjacent elements of a sequential pattern.

34. The system as recited in claim 33, wherein each means for deleting comprises:

means for determining, for each candidate k-sequence c of the set $C_k$ and for each contiguous (k-1)-subsequence s of c, whether the contiguous (k-1)-subsequence s is present in a set $L_{k-1}$ of all frequent (k-1)-sequences; and means for deleting the candidate k-sequence c from the set $C_k$, if the contiguous (k-1)-subsequence s is not present in the set $L_{k-1}$.

35. The system as recited in claim 31, wherein the generated candidate sequences are organized using a hash-tree data structure, thereby permitting the candidate sequences supported by a data sequence d to be found quickly during the step of identifying, the hash-tree having a root, a plurality of interior nodes, and a plurality of leaf nodes, each interior node representing a hash table having a plurality of buckets, each leaf node representing a list of candidate sequences; and the system further comprises:

means for adding a candidate sequence to the hash-tree after the candidate sequence is generated; and means for finding the candidate sequences of the hash-tree that are contained in the data sequence d, when counting the support for the candidate sequences.

36. The system as recited in claim 35, wherein the means for adding a candidate sequence comprises:

means for initializing a current node to be the same as the root of the hash-tree, the current node having a depth p equal to one;

means for applying a hash function to a p-th item of the candidate sequence to determine a bucket b in the hash table of the current node, if the current node is one of the interior nodes, the bucket b corresponding to a node of the hash-tree;

means for setting the current node to the node corresponding to the bucket b, and means for incrementing the depth p by one; and means for repeating the operation of the means for applying, setting, and incrementing, as long as the current node is an interior node;

means for adding the candidate sequence to the current node, if the current node is one of the leaf nodes; and means for converting the current node to an interior node, if the number of candidate sequences in the current node exceeds a predetermined threshold.

37. The system as recited in claim 35, wherein the means for finding the candidate sequences comprises:

means for initializing a current node to be the same as the root of the hash-tree;

means for applying a hash function to each item of the data sequence d to determine a set of buckets in the hash-table of the current node, if the current node is one of the interior nodes, each bucket b of the set of buckets corresponding to a node of the hash-tree;

for each bucket b in the set of buckets, means for setting the current node to the node corresponding to the bucket b; and means for repeating the operation of the applying means and setting means, as long as the current node is an interior node;

means for determining, if the current node is one of the leaf nodes and for each candidate sequence s in the current node, whether the data sequence d supports the candidate sequence s; and means for incrementing a count of the candidate sequence s, if s is supported by the data sequence d.

38. The system as recited in claim 37, wherein the means for determining whether the data sequence d supports the candidate sequence s comprises a forward phase and a backward phase;

the forward phase includes:

means for finding successive elements $s_i$ of the candidate sequence s in the data sequence d, as long as the difference between end-time($s_i$) and start time($s_{i-1}$) is less than or equal to a maximum time-gap between adjacent elements of a sequential pattern, end-time ($s_i$) being an end-time of a just found element and start-time($s_{i-1}$) being a start-time of an element preceding the just found element, whereby the data sequence d does not contain the candidate sequence s if no element $s_i$ of s is found in d; and means for switching to the backward phase if $s_i$ is not a first element of s and the difference between end-time($s_i$) and start-time($s_{i-1}$) is more than the maximum time-gap; and the backward phase includes:

means for finding preceding elements $s_{i-1}$ of the candidate sequence s in the data sequence d, after time end-time($s_i$) minus the maximum time-gap, as long as the difference between end-time($s_i$) and start-time ($s_{i-1}$) is more than the maximum time-gap; and means for switching to the forward phase if the just found element is the first element of s, or if the difference between end-time($s_i$) and start-time($s_{i-1}$) is equal to or less than the maximum time-gap.

39. The system as recited in claim 38, wherein the means for finding successive elements comprises:

means for finding, starting at a time t and for each item of an element of the candidate sequence s, a first occurrence of the item in the data sequence d after time t, if the first occurrence for any item of the element is not found, the element is not contained in the data sequence d after time t, means for comparing, in case the first occurrence for each item of the element is found, the difference between an end-time and a start-time of the element to a time window, if the difference between the end-time and the start-time of the element is equal to or less than the time window, the element is present in the data sequence d;

means for setting time t equal to the end-time of the element minus the time window, if the difference between the end-time and the start-time of the element is more than the time window; and means for repeating the operation of the system, for the next item of the element.

40. The system as recited in claim 31, wherein the taxonomy is a directed acyclic graph (DAG) taxonomy, the DAG taxonomy having a plurality of vertexes and a plurality of edges, each edge connecting a pair of vertexes, and each vertex corresponding to an item.

41. The system as recited in claim 40, wherein each data sequence is replaced by an extended data sequence, the extended data sequence including transactions which have all the items in corresponding transactions of the data sequence, and all the ancestors of all the items in the corresponding transactions.

42. The system as recited in claim 41 further comprising:

means for accessing the DAG taxonomy to predetermine the ancestors of each item before each generation of candidate sequences; and means for deleting any predetermined ancestor which is not in any of the candidate sequences being counted.

43. The system as recited in claim 42 further comprising means for deleting any generated candidate sequence which has an element containing both an item and an ancestor of the item.

44. The system as recited in claim 42, wherein the means for accessing includes means for adding the predetermined ancestors of the item to a set of predetermined ancestors; and the system further comprises:

means for adding, for each element $s_i$; in each data sequence s, and for each item x in the element $s_i$, the ancestors of the item x which are present in the set of predetermined ancestors to the element $s_i$; and means for removing duplicates of items in $s_i$ from each element $s_i$ of the data sequence s, prior to counting the support for the candidate sequences.

45. The system as recited in claim 31, wherein the means for generating candidate sequences includes means for generating as many candidate sequences as they will fit into a temporary data memory; and the system further comprises:

means for writing the found frequent candidate sequences into a data storage area; and means for deleting from the temporary data memory the candidate sequences without minimum support.

* * * * *